United States Patent
Sothje et al.

(10) Patent No.: US 10,633,507 B2
(45) Date of Patent: Apr. 28, 2020

(54) METHOD OF RECYCLING PHENOL RESIN-CONTAINING MATERIALS, ESPECIALLY PHENOL RESIN-BASED FIBER COMPOSITE MATERIALS

(71) Applicant: Fraunhofer-Gesellschaft zur Foerderung der angewandten Forschung e.V., Munich (DE)

(72) Inventors: Dominik Sothje, Berlin (DE); Christian Dreyer, Niederwoerresbach (DE); Monika Bauer, Koenigs-Wusterhausen (DE); Jurgen Lang, Ahrendsfelde (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 64 days.

(21) Appl. No.: 15/774,715

(22) PCT Filed: Nov. 9, 2016

(86) PCT No.: PCT/EP2016/077082
§ 371 (c)(1),
(2) Date: May 9, 2018

(87) PCT Pub. No.: WO2017/081061
PCT Pub. Date: May 18, 2017

(65) Prior Publication Data
US 2019/0241713 A1     Aug. 8, 2019

(30) Foreign Application Priority Data

Nov. 13, 2015   (DE) .................. 10 2015 119 680
Mar. 11, 2016   (DE) .................. 10 2016 104 518

(51) Int. Cl.
| | | |
|---|---|---|
| C08G 8/10 | (2006.01) | |
| C08J 11/28 | (2006.01) | |
| C08G 8/32 | (2006.01) | |
| C08K 5/17 | (2006.01) | |

(52) U.S. Cl.
CPC ............. *C08J 11/28* (2013.01); *C08G 8/10* (2013.01); *C08G 8/32* (2013.01); *C08K 5/17* (2013.01); *C08J 2361/06* (2013.01); *C08J 2361/10* (2013.01); *Y02P 20/582* (2015.11); *Y02W 30/706* (2015.05)

(58) Field of Classification Search
USPC ............................................. 521/40
See application file for complete search history.

(56) References Cited

U.S. PATENT DOCUMENTS 6,465,702 B1   10/2002   Von Gentzkow et al.

FOREIGN PATENT DOCUMENTS

| DE | 236324 A1 | 6/1986 |
|---|---|---|
| DE | 266574 A1 | 4/1989 |
| DE | 10065087 A1 | 8/2002 |
| DE | 102015111939 B3 | 4/2016 |
| EP | 1107938 B1 | 1/2003 |
| JP | S58164613 A | 9/1983 |
| WO | 94/09062 A1 | 4/1994 |

OTHER PUBLICATIONS

Pilato, L.: Phenolic Resins: A Century of Progress, Springer Verlag, Berlin, Heidelberg, 2010, ISBN: 978-3-642-04713-8.
Ozaki, J.; Djaja, S. K. I.; Oya, A.: Chemical Recycling of Phenol Resin by Supercritical Methanol, Industrial & Engineering Chemistry Research, 39, 2000, pp. 245-249.
Tagaya, et al. (Tagaya, H.; Suzuki, Y.; Komuro, N.; Kadokawa, J.: Reactions of model compounds of phenol resin in sub- and supercritical water under an argon atmosphere, Journal Material Cycles and Waste Management, 3 (Nr. 1), 2001, p. 32-37.
Goto, M.; Sasaki, M.; Hirose, T.: Reactions of polymers in supercritical fluids for chemical recycling of waste plastics, Journal of Materials Science, 41 (Nr. 5), 2006, S. 1509-1515.
Database WPI Week 198345 Thomson Scientific, London, GB; AN 1983-810871 XP002765812.

*Primary Examiner* — Terressa Boykin
(74) *Attorney, Agent, or Firm* — Duane Morris LLP

(57) ABSTRACT

The present invention relates to a method for degradation of a phenolic resin-containing material, characterized in that the phenolic resin-containing material is subjected to an aminolysis with a reagent containing at least one amino group, as well as a method for synthesis and degradation of a phenolic resin-containing material, characterized in that the phenolic resin-containing material is created by curing the starting components at a temperature of less than 140° C. and is subjected to aminolysis with a reagent containing at least one amino group for the purpose of degradation.

22 Claims, 10 Drawing Sheets

METHOD OF RECYCLING PHENOL RESIN-CONTAINING MATERIALS, ESPECIALLY PHENOL RESIN-BASED FIBER COMPOSITE MATERIALS

The invention relates to a method for degradation of materials that contain phenolic resin, in particular phenolic resins, phenolic resin prepolymers, plastics that contain phenolic resins and fiber composite plastics based on phenolic resins. The invention additionally relates to special materials which contain phenolic resin and with which such degradation is particularly successful. Degradability can be influenced in a positive sense in part by the curing conditions in the production of these materials and in part by their chemical composition. Finally, the invention relates to a recycling method, in which the degradation product of the method according to the invention is used as a component for production of new polymers.

Fiber composite plastics represent a synergistic combination of properties of the individual components: namely, the properties of the reinforcing and force-absorbing fibers and the properties of the polymeric shape-imparting matrix which also serves as protection against external influences. The great strength and rigidity of the fiber composite plastics, combined with the comparatively low density, are particularly exceptional which predestines this class of materials for lightweight construction, for example, in the aviation and automotive industries or for production of wind power plants. Furthermore, fiber-reinforced plastics can be produced in virtually any geometric design.

Phenolic resins are characterized in particular by their high inherent flame retardancy and their high dimensional heat-stability. Furthermore, they have a high solvent resistance and good resistance to slightly acidic and basic chemicals. These properties make this class of duromers of interest in particular as a shape-imparting matrix for fiber composite plastics in aviation, for safety helmets, friction coatings for floor coverings or fiber-reinforced boards.

There are essentially two classes of phenolic resins that may be formed in the reaction of phenol with formaldehyde: novolaks and resols. These two basic types of reactions between phenol and formaldehyde (forming resols and novolaks) are diagrammed schematically in the following reaction scheme. In addition to phenol, o-, p-, and m-cresol are frequently also used as starting materials for synthesis of phenol-formaldehyde resins. In addition to formaldehyde, for example, acetaldehyde, propionaldehyde, n-butyraldehyde, isobutyraldehyde, glyoxal and furfural may also be used, for example.

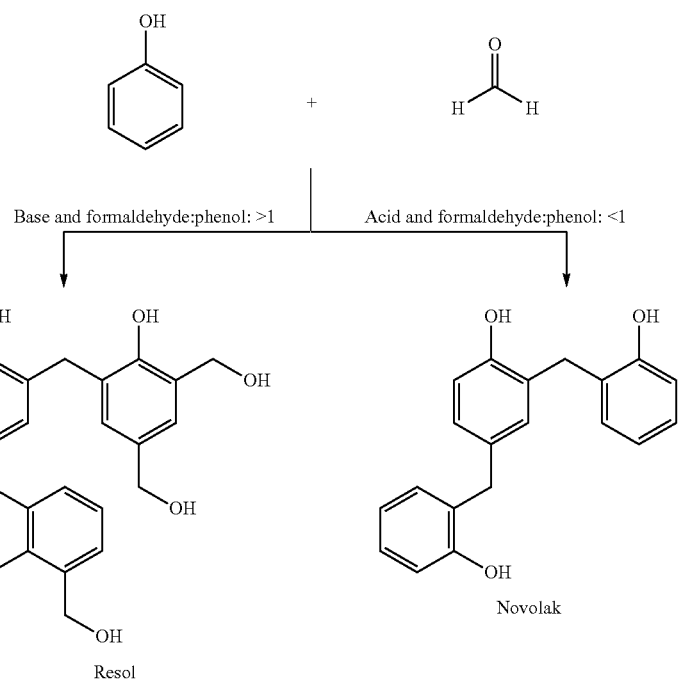

Basically, methylene and dimethylene ether bridges are always formed in the production of phenolic resins, as shown below. The amount of the respective bridges depends on the composition of the resin and the reaction conditions in production and curing.

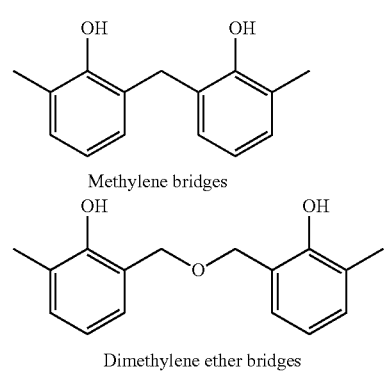

If phenol is reacted with an excess of formaldehyde under basic conditions, resols (condition A) are obtained first, then resitols (condition B) and finally resites (condition C) are obtained as the reaction proceeds. Resols have methylene and dimethylene ether bridges and are self-curing.

If phenols are reacted with a substoichiometric amount of formaldehyde with acid catalysis, then novolaks are obtained. These are not self-curing and must be cured subsequently by adding curing agents, in particular polyfunctional amines such as, for example, hexamethylenetetramine (HEXA, urotropine). Since the addition of a further curing agent can induce the complete formation of a network, novolak prepolymers are more stable during storage than resol prepolymers. A network formed in curing with hexmethylenetetramine is diagrammed schematically below. Due to the curing with hexamethylenetetramine, aminodimethylene bridges are also formed in addition to methylene ether bridges and dimethylene ether bridges:

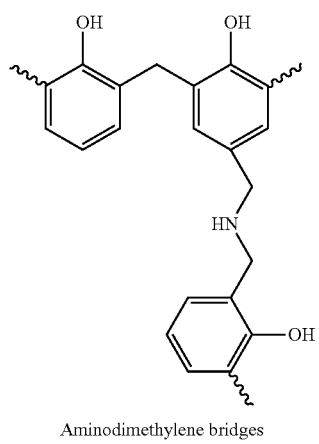

Aminodimethylene bridges

According to the current state of the art, phenolic resins or their products, in particular fiber composite plastics produced therefrom, can be recycled only in a very energy-intensive and/or time-consuming manner, which is therefore expensive. Phenolic resins, as plastics with three-dimensional crosslinking, cannot be melted or dissolved and therefore cannot undergo a simple recycling process like that used for thermoplastics and metals. The conventional option of disposing of composite materials easily, inexpensively without pretreatment in above-ground dumps in the past is no longer possible because of the Amendment to the Municipal Waste Management Regulations, which went into effect on Jun. 1, 2005, and the Regulations Governing Landfills and Long-Term Storage, Waste Management Regulations (DepV) of May 2, 2013. Burning of such materials has become especially difficult because of the requirements defined in § 5 of the 17th BlmSchV, regulations about incineration and co-incineration of waste of May 2, 2013. The limit values stipulated there are often not achieved, so that according to the current status, in most cases the only means of disposal is still in underground dumps. However, this is not an acceptable long-term solution, so that shredding and subsequent use as a filler material has so far been the most common choice for recycling duromers and products made from them. However, high-quality substantive recycling is ensured only when high-quality products can again be produced from secondary materials.

In the methods known from the literature for chemical recycling of cured phenolic resins, a very aggressive treatment under very high temperatures and high pressures is often necessary. In addition, the equipment required for accomplishing this (an autoclave with a stirring mechanism) is usually very complicated and expensive. The methods known from the literature for recycling these two types of phenolic resins, resols and novolaks, are as described below.

Resols can be decomposed by hydrogenation (see EP 1 107 938 B1, Gentzkow et al.). Decomposition then takes place with tetraline as the hydrogen donor in a bomb tube at temperatures between 300° C. and 350° C. The process time amounts to approximately 5 hours. The working group around Gentzkow was able to convert the phenolic resin at 330° C. into tetraline-soluble products that contained significant amounts of phenols as well as various cresols (o-, m-, and p-cresol).

Novolaks can be decomposed by means of hydrolysis (Pilato, L.: Phenolic Resins: A Century of Progress, Springer Verlag, Berlin, Heidelberg, 2010, ISBN: 978-3-642-04713-8) or methanolysis (Ozaki, J.; Djaja, S. K. I.; Oya, A.: Chemical Recycling of Phenolic resin by Supercritical Methanol, Industrial & Engineering Chemistry Research, 39, 2000, pages 245-249).

In methanolysis, the material is decomposed by using supercritical methanol in an autoclave at 10 MPa under nitrogen at temperatures of up to 420° C. By means of gas chromatography, phenol and methylated phenol derivatives were detected in the degradation products. Hydrolysis involves decomposition using supercritical water and sodium hydroxide as the catalyst. A maximum possible degree of degradation of 70% is achieved at a reaction temperature of 480° C. with the degradation products formed including both phenol monomers and oligomeric phenolic resin radicals.

For decomposition of phenolic resins (resols and novolaks) with supercritical water, Tagaya et al. (Tagaya, H.; Suzuki, Y.; Komuro, N.; Kadokawa, J.: Reactions of model compounds of phenolic resin in sub- and supercritical water under an argon atmosphere, Journal Material Cycles and Waste Management, 3 (no. 1), 2001, pp. 32-37) conducted experiments on model compounds. The focus of this work was on elucidation of the decomposition mechanisms. A 10 mL Carius tube filled with argon was used. The reaction temperature was between 250° C. and 430° C. with a reaction time between 0.25 h and 1.5 h. The reaction products were analyzed by GC/MS using an FID detector. In addition, it was found that depending on the type of phenolic resin used, tetraline or alkali salts could function as the catalyst. The work group around Goto was also concerned with the decomposition of phenolic resins by means of supercritical water and alcohols (Goto, M.; Sasaki, M.; Hirose, T.: Reactions of polymers in supercritical fluids for chemical recycling of waste plastics, Journal of Materials Science, 41 (no. 5), 2006, pp. 1509-1515). These studies were concerned primarily with the resulting products as a function of the reaction management.

Furthermore, phenolic resins (resols and novolaks) cured according to Horiuchi and Fukuda can be decomposed in a great excess of phenol in relation to phenolic resin (Pilato, L.: Phenolic Resins: A Century of Progress, Springer Verlag, Berlin, Heidelberg, 2010, ISBN: 978-3-642-04713-8). If a cured phenolic resin is boiled with a great excess of phenol and a small amount of acidic catalyst (e.g., p-toluenesulfonic acid), the cured resin is converted into low-molecular phenol-soluble compounds. The reaction time is 3 h to 5 h. In this method the renewed formation of a novolak with properties comparable to those of the starting resin is possible by subsequent addition of formaldehyde and hexamethylenetetramine. However, it is very difficult to separate the phenol used as the decomposition reagent from the degradation products.

Because of the interest in the recycling topic and with a view toward a resource-conserving economy, it would be desirable to have recycling concepts with which materials that contain phenolic resin could be recycled easily and efficiently. It would be desirable in particular to influence the production of the aforementioned materials if possible to the extent that such recycling would succeed with good yields.

The inventors of the present invention have therefore been confronted with the task of discovering a method, with which materials that contain phenolic resin can be decomposed chemically to the extent that reusable products can be obtained, preferably monomeric or oligomeric units which can be used to synthesize novel plastics. This object also includes recovery of reinforcing fibers contained in fiber composite plastics without resulting in a significant reduction in their mechanical properties. And finally, specific materials that contain phenolic resin are to be made available, which can be decomposed with particular ease and optionally reused.

This object is achieved with a method in which the phenolic resin-containing material is subjected to an aminolysis, i.e., reaction with an amine. The inventors of the present invention have been able to ascertain in this process that in contrast with the known methods using methanol and water, no supercritical conditions are required in such an aminolysis. In the case of a fiber composite plastic with a phenolic resin matrix, almost all the reinforcing fibers generally used, for example, carbon fibers, glass fibers, aramid fibers and natural fibers, are not damaged. In individual cases in which fibers that are sensitive to strongly basic amines were used, a special choice of the amine provided for use in aminolysis is possible.

DETAILED DESCRIPTION OF THE INVENTION

Figure 1:
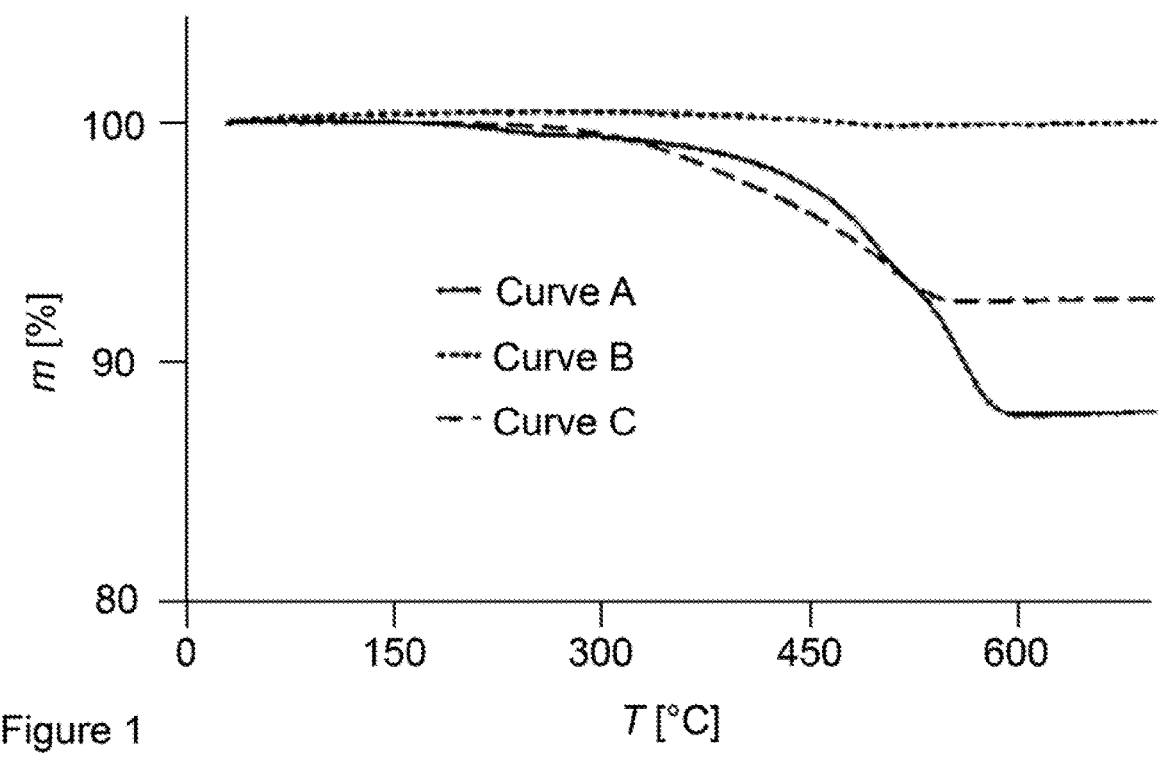
FIG. 1 shows as three TGA curves for illustration: curve A shows the values for a laminate; curve B shows the values for a fabric containing resin residues; curve C shows the values for a fabric from which the matrix has been removed completely.

The term "phenolic resin-containing materials" is understood according to the invention to include all such materials consisting either of phenolic resin (usually cured either by self-curing or by the addition of a curing agent, preferably completely cured) or containing such a phenolic resin as a component, for example, but not exclusively in the form of a matrix (e.g., for fiber composite plastics). The expression also includes those materials that contain phenolic resin as an unwanted impurity, for example, tools which are used in the production of phenolic resins. The term "phenolic resin-containing materials") as used according to the invention is preferably to be understood to mean that the phenolic resin-containing materials do not contain any benzoxazine resins and, more preferably, also do not contain any benzoxazine resin prepolymers or plastics that contain benzoxazine resin.

As found as part of work conducted at the Fraunhofer Facility for Polymer Materials and Composites PYCO, degradability depends to a great extent on the chemical structure of the phenolic resin used. If the phenolic resin contains many dimethylene ether bridges or aminodiethylene bridges, then a substantially larger amount of the resin can be decomposed by the method according to the invention. In many cases, this allows, through the choice of the curing conditions, to influence the ability of phenolic resin-containing materials to be decomposed under aminolytic conditions.

Depending on the specific chemical structure, the matrix of phenolic resin-containing fiber composite plastics can always be degraded by the method according to the invention to the extent that in addition to the decomposed resin matrix, it is also possible to recover a fiber material that has been completely freed of resin matrix or partially freed but is still always flexible and reusable.

The amount of dimethylene ether bridges also depends greatly on the curing temperature and curing time, in which the material containing the phenolic resin was produced, in addition to depending on the composition of the phenolic resin and the catalyst used. If phenolic resins are cured at low temperatures and/or for a short period of time, they contain a significantly greater amount of dimethylene ether bridges than the same resins after longer curing times or higher temperatures. This correlates with better chemical degradability. A conclusion can be drawn by means of elemental analysis to ascertain the relative amount of dimethylene ether bridges. The oxygen content can be determined either directly or indirectly, but in the latter case, it is first necessary to quantify all the other elements contained in the polymer, and then the remainder corresponds to the oxygen content. If many dimethylene ether bridges are present, then the oxygen content is high accordingly. If there are only a few dimethylene ether bridges, then the oxygen content is lower accordingly.

The amount of aminodimethylene bridges in the novolak resin depends on the amount of amine-curing agent used (e.g., hexamethylenetetramine). When the curing agent content is high, the resulting polymer also has a higher nitrogen content and thus contains a larger amount of aminodiethylene bridges. The nitrogen content can be determined directly by means of elemental analysis.

If, in the production of phenolic resins, an attempt is made for the phenolic resins to have a composition favorable for subsequent degradation, i.e., for them to contain a large amount of dimethylene ether bridges and/or aminodimethylene bridges, and if they are cured at a relatively low curing temperature, then the chemical degradability and thus the subsequent recyclability of the product obtained from this resin can be influenced greatly in the desired sense in advance. Nevertheless, not all novolak resins can be degraded completely. The degradation of novolak resins surprisingly succeeds largely or even completely if the resins are produced by using a large amount of triglycerides that contain unsaturated fatty acids, e.g., wood oil (tung oil), and cured with a large amount of amine. Wood oil is a mixture consisting mainly of triglycerides. The triple-unsaturated fatty acid α-elaeostearic acid constitutes the largest fraction of fatty acids of triglycerides. In addition, oleic acid radicals (approximately 15%), palmitic acid radicals (approximately 4%) and stearic acid radicals (approximately 1.3%) are present—each bound as glycerol esters.

An aminolysis reaction involving phenolic resins can generally be initiated by any gaseous amine, but preferably a liquid or dissolved amine, under degradation conditions. Depending on the constitution of the phenolic resin and optionally the reinforcing fibers, these radicals include in particular ammonia, hydrazine, primary and secondary amines and hydrazines with aliphatic or aromatic radicals, which may in turn be substituted. Therefore, any primary amines of saturated or unsaturated, linear, branched or cyclic aliphatic or aromatic hydrocarbons, including the corresponding hydrazines and naturally ammonia and hydrazine itself may be used for this reaction. The branching or chain length of the hydrocarbon radical plays only a subordinate role in this reaction as long as the amino function has sufficient reactivity with respect to the phenolic resins. However, it may be advantageous to a certain extent to use hydrophobic hydrocarbon radicals (e.g., longer aliphatic chains e.g., with at least 5 carbon atoms in primary amines and α-ω-diamines and/or at least 3 carbon atoms in α-ω-amino alcohols).

The primary and secondary amines that are used may also have other substituents, depending on the desired substitution pattern of the reaction products. Another amino or hydroxyl function is especially advantageous. Likewise other substituents may also be present but care should be taken to ensure that they do not have a negative effect on the reaction process.

Accordingly the aforementioned method is preferably carried out by aminolysis with an aminolysis reagent selected from an amine of formula (1)

$$H_2N-X \qquad (1)$$

and/or an amine of Formula (2)

$$Z-NH-X \qquad (2)$$

or a mixture of a plurality of the aforementioned reagents, wherein X is selected from —H, —OH, —NH$_2$ and —NHR$^1$ and R$^1$ is an aliphatic or aromatic hydrocarbon radical with preferably 1 to 20 carbon atoms, which may be substituted. Instead of that, X may also be a group R$^2$—Y, where R$^2$ is a divalent aliphatic or aromatic hydrocarbon radical, in particular with 1 to 20 carbon atoms, and Y stands for any monovalent radical, but in particular for —H, —OH, —NH$_2$ or —NHR$^1$.

Z is an aliphatic or aromatic hydrocarbon radical preferably with 1 to 20 carbon atoms, more preferably 5 to 20 carbon atoms in the case of an aliphatic hydrocarbon radical, which may be substituted. In particular, Z may also be a group R$^3$-A, where R$^3$ is a divalent aliphatic or aromatic hydrocarbon radical with the preferred chain length cited above for Z, and A represents any monovalent radical, but in particular for —OH, —NH$_2$ or —NHR$^1$, where R$^1$ is defined as indicated above.

The aminolysis reagents in the present invention are preferably liquid at room temperature or at a higher temperature. They may optionally be dissolved in a solvent and/or diluted with a solvent, for example, an alcohol, optionally also in water (in particular if ammonia is to be used), preferably in a cyclic ether, alcohol, chlorinated hydrocarbon or a solvent containing nitrogen or a combination of several such solvents. In particular the solvent used may be tetrahydrofuran, dimethyl sulfoxide, ethanol, water, dioxane, dichloromethane, chloroform, dimethylformamide or N-methyl-2-pyrrolidone or a mixture of two or more of these solvents.

Preferably, however, (optionally heated) liquid amines are used without any added solvent.

The method according to the invention allows to recover low-molecular components from cured starting materials that contain phenolic resins. It was shown that these components contain free amino groups and/or hydroxyl groups, which is why they can be used after suitable workup or even directly without workup as a raw material for new synthesis of polymers. A possible example that can be mentioned for such a new synthesis includes in particular the production of phenolic resins, in which the degradation products obtained by aminolysis may e.g. be added to the starting materials for synthesis of the desired phenolic resins (novolak or resol resins) and be incorporated into the newly formed polymer network. Examples include the reaction with additional monomers, oligomers or polymers that are at least bifunctional or can be bifunctionalized and which react in a polyreaction (polyaddition or polycondensation) with amino groups and/or hydroxyl groups. Thus, the recycling products can be processed by direct reaction with isocyanates to form polyureas or polyurethanes. Reaction with activated (meth) acrylic acid compounds such as acrylic chlorides and anhydrides is also possible, preferably followed by a radical crosslinking in this case. The recycling products can also be copolymerized with cyanates or used for curing with epoxy resins.

The method according to the invention is preferably carried out at temperatures of −20° C. to +250° C., in particular up to the boiling point of the agent that is used. If the reaction is carried out under pressure, the temperature can also be increased above the boiling point (at normal pressure) of the agent used. However, this is usually not necessary. Aminolysis can also be supported by applying microwave energy, wherein an additional application of direct thermal energy by heating is usually not necessary, although it should not be ruled out. The rate of decomposition here usually depends on the amount of energy supplied (thermal, by microwave treatment).

In addition, the inventors have been able to show that not only fabric that has been completely freed of phenolic resin matrix but also fabric that still contains residues of phenolic resin can be recycled—with specific exceptions. Components produced from fabrics with residual resin adhering to them still retain approximately 80% of the mechanical properties in comparison with components produced from new fabrics or those completely freed of the old matrix. These fabrics are therefore suitable for a variety of applications.

The method according to the invention may also be used for cleaning tools soiled with phenolic resins.

The invention is explained in greater detail by the following exemplary embodiments.

EXEMPLARY EMBODIMENTS

A. Production of the Resins and Measurement Methods Used

To carry out experiments in recycling of phenolic resin systems, systems based on novolak as well as those based on resol were used. Sheets of pure resin can be produced from phenolic resins only with substantial effort, so glass fiber laminates with a phenolic resin matrix were produced for the recycling experiments. As the fiber reinforcement fabric, a fabric with a satin weave used in aviation was used.

To determine the amount of resin remaining on the fibers after the decomposition experiments, thermogravimetric analyses (TGA) were performed. To do so, the fabric that had been freed of the resin matrix by chemical degradation was removed from the reaction vessel after the end of the recycling experiment and washed with ethanol. The fabrics, which were then dried at room temperature, were heated to 700° C. with a ramp of 10K·min$^{-1}$ using TGA, and the weight loss was determined, corresponding to the amount of resin remaining on the fabric—disregarding oxidation effects. In the same manner, untreated laminate was subjected to thermogravimetric analysis. The determined weight loss corresponds to the resin content of the laminate.

FIG. 1 shows as three TGA curves for illustration: curve A shows the values for a laminate; curve B shows the values for a fabric containing resin residues; curve C shows the values for a fabric from which the matrix has been removed completely.

The resin degradation Δm is determined from the values obtained by TGA using the following equation (1):

$$\Delta m = 100 * \{1 - [(A_2 - E_2) * E_1] / [(A_1 - E_1) * E_2]\} \quad (1)$$

where
Δm=percentage degradation of the matrix resin [wt %]
A=initial weight of the sample [g]
E=remaining weight after TGA analysis (weight of the glass fabric) [g]
Index 1=untreated laminate
Index 2=fabric obtained after recycling
The resin degradation indicates the percentage of the resin matrix which has been chemically degraded.

B. Synthesis Examples

B1. Resol Impregnating Resin

A resol impregnating resin was synthesized according to the following procedure:

First, 688.5 g phenol and 682.6 g of a 37% formaldehyde solution were placed in a 1.5 L sulfation flask with a KPG stirrer, a thermometer, a condenser and an electric heater. The heater was turned on, and 16.1 g of a 28% ammonia solution was added promptly by drops. The reaction mixture was heated to 70° C., with the temperature rising to approximately 72° C. after about 3 minutes. Within 23 min, the mixture was heated slowly to the boiling point. Boiling started at a reaction temperature of 98° C., which also corresponds to the start of the time measurement. Within 25 min, 109 g water was distilled off. The boiling point rose to 100° C. Subsequently, the reaction mixture was heated at reflux, and after a total reaction time of 40 min, 3.2 g more ammonia was added and the B time was determined at regular intervals:

after 1 h 40 min, C, B time (150° C.): 5 min 45 sec
after 3 h, boiling point 98.4° C., B time (150° C.): 14 min 30 sec
after 3 h 45 min, boiling point 98.1° C., B time (150° C.): 9 min 40 sec
after 4 h 10 min, boiling point 97.8° C., turbidity starting at the surface
after 4 h 15 min, boiling point 97.8° C., B time (150° C.): 7 min 50 sec
after 4 h 35 min, boiling point 97.9° C., B time (150° C.): 8 min 30 sec, completely cloudy
after 5 h, boiling point 98.0° C., B time (150° C.): 5 min 45 sec After 5 h and 10 min, the heater was removed and the batch was cooled to a temperature of 75° C. for 5 min on a water bath. The batch was then placed in a 2-L round bottom flask and the water of condensation was distilled off at a temperature of 75° C. on the rotary evaporator in vacuo. Then 80 g methanol was added to the phenolic resin, the mixture was transferred to a glass flask and stored under refrigeration.

The resin synthesized in this way was used to produce laminates which were used for the following recycling experiments.

B2. Novolak Impregnating Resins
(a) A Novolak Impregnating Resin was Synthesized According to the Following Procedure:

First, 645.0 g phenol and 2.82 g p-toluenesulfonic acid monohydrate were placed in a 2.5 L sulfation flask with a KPG stirrer, thermometer, cooler and electric heater. The mixture was heated until the phenol was molten and the acid was dissolved (59° C.). Then the mixed was cooled to 46° C. and 100 g wood oil (tung oil) were weighed in. The solution turned to a brown color and heated up slightly. Next the reaction mixture was heated to 80° C. and the temperature was maintained for 40 minutes. Within 4 minutes, the mixture was cooled to 50° C. in a water bath and 7.5 g hexamethylenetetramine was added. While stirring, the mixture was heated to 74° C. within 15 min. At 70° C. 532.0 g formaldehyde was added. Then the temperature dropped to 47° C. and the batch formed a clear solution. Stirring was continued for 5 minutes and the pH was checked (pH=5.6). Within 32 minutes, the mixture was cautiously brought to the boiling point. Boiling started at a reaction temperature of 99.3° C., which corresponded to the start of the reaction time measurement. After 7 minutes, the solution became slightly cloudy; 30 minutes after the start of the reaction, 125 g water was distilled off within 15 minutes, whereupon the solution became clear again. The B time was determined at regular intervals:

after 1 h 20 min, B time: 8 min 30 sec
after 1 h 40 min, B time: 7 min 50 sec
after 1 h 50 min, B time: 7 min 40 sec
after 2 h, B time: 7 min 5 sec After 2 h 8 min, the heater was removed and the batch was cooled to a temperature of 64° C. on a water bath. Then 5 g butanol was added to the mixture, and the batch was transferred to a 2 L round bottom flask. Within 90 minutes at 80° C., 428 g water was removed on the rotary evaporator.

A subsequent determination of the B time yielded 6 minutes.

While cooling on a water bath, 70 g methanol was added to the phenolic resin, the mixture was transferred to a glass flask and stored under refrigeration.

(b) A novolak impregnating resin was produced by a method like that described in section (a), except that 6 wt % hexamethylenetetramine, based on the total resin components and hexamethylenetetramine, was added.

The resins synthesized in this way were used to produce laminates in which recycling experiments were conducted.

C. Examples of Degradability

Example 1

Three different glass fiber-reinforced laminates were produced from resol resin systems synthesized according to synthesis example B1. After impregnation of the glass fiber fabric using the phenolic resin dissolved in methanol, a preliminary crosslinking was carried out in a circulating air furnace. Then the prepregs produced in this way were pressed by hydraulic press to form two-layer laminates, with variations in both the curing temperature (Experiment 1: 130° C., Experiment 2: 150° C., Experiment 3: 170° C.) as well as the curing time (Experiment 1: 30 min, Experiment 2: 15 min, Experiment 3: 15 min).

Then the laminates produced in this way were boiled for 24 h in 1,2-diaminoethane (boiling point 116° C.) at reflux.

As shown in Table 1, the phenolic resin matrix of laminates cured at a low temperature can be decomposed significantly better than the phenolic resin matrix of laminates cured at a higher temperature. Consequently, the percentage amount of degraded resin matrix HA determined by means of TGA, as listed under A, is much higher in the laminate 1 cured at 130° C. (57±10 wt %) than in the laminate 3 cured at 170° C. (1 wt %).

It was found by means of elemental analysis (performed two to three times for each one of the three resins cured in different ways) that the laminates cured at a lower temperature have a significantly higher oxygen content than those cured at a higher temperature. This suggests a different network structure, i.e., a different amount of dimethylene ether bridge bonds. The higher the oxygen content in the analyzed phenolic resin system, the higher is also the amount of dimethylene ether bridge bonds and the better is the chemical decomposition of the respective phenolic resin system.

This means that a significantly better decomposability and consequently a better recyclability of the cured phenolic resin is achieved through a skilled choice of the curing program.

TABLE 1

| No. | N [wt %] | C [wt %] | H [wt %] | $m_{sample}$ [mg] | N, C, H [wt %] | O [wt %] | Resin degradation in 1,2-diamino-ethane [wt %] | $T_{curing}$ [° C.] | $t_{curing}$ [min] |
|---|---|---|---|---|---|---|---|---|---|
| 1.1 | 0.21 | 75.03 | 6.02 | 1.38 | — | — | 57 ± 10 | 130 | 30 |
| 1.2 | 0.22 | 75.10 | 6.04 | 1.33 | — | — | | | |
| 1 | 0.21 | 75.06 | 6.03 | — | 81.31 | 18.69 | | | |
| 2.1 | 0.22 | 75.92 | 6.00 | 1.37 | — | — | 41 ± 10 | 150 | 15 |
| 2.2 | 0.22 | 76.00 | 6.01 | 1.39 | — | — | | | |
| 2.3 | 0.24 | 77.21 | 5.84 | 1.35 | — | — | | | |
| 2 | 0.23 | 76.38 | 5.95 | — | 82.56 | 17.44 | | | |
| 3.1 | 0.24 | 77.61 | 5.85 | 1.34 | — | — | 1 | 170 | 15 |
| 3.2 | 0.24 | 77.30 | 5.84 | 1.36 | — | — | | | |
| 3 | 0.24 | 77.46 | 5.84 | — | 83.54 | 16.46 | | | |

Example 2

Example 2(a)

A novolak resin system synthesized according to synthesis example B2(a), dissolved in methanol, was used for impregnation of a glass fiber fabric. Then a preliminary crosslinking was performed in a circulating air furnace. Next the prepregs produced in this way were pressed by means of a hydraulic press to form two-layer laminates. The curing temperature was 130° C. and the curing time was 40 min.

Next the laminate produced in this way was boiled for 1 h in 2-amino ethanol (boiling point 172° C.) at reflux. The resin matrix of the cured laminates was partially decomposed.

Example 2(b)

A novolak resin system synthesized according to synthesis example B2(b), dissolved in methanol, was used for impregnation of a glass fiber fabric. After that, a preliminary crosslinking was performed in a circulating air furnace. Next the prepregs produced in this way were pressed by means of a hydraulic press to form two-layer laminates. The curing temperature was 130° C. and the curing time was 40 min in some cases and 45 min in others.

Then the laminate produced in this way was boiled for 24 h in 1,2-diaminoethane (boiling point 116° C.) at reflux. The resin matrix of the cured laminates was decomposed completely so that a fabric from which the matrix had been removed completely was recovered.

Example 2(c)

Example 2(b) was repeated with the difference that the curing temperature was 150° C. and the curing time was 30 min. Next the laminate produced in this way was boiled for 24 h in 1,2-diaminoethane (boiling point 116° C.) at reflux. The resin matrix of the cured laminates was decomposed approximately 92%.

Example 2(d)

Example 2(b) was repeated with the difference that the curing temperature was 170° C. and the curing time was 20 min. Next the laminate produced in this way was boiled for 24 h in 1,2-diaminoethane (boiling point 116° C.) at reflux. The resin matrix of the cured laminates was decomposed approximately 42%.

The better degradability of the laminate used in example 2(b) in comparison with the laminates used in examples 2(c) and 2(d) can be attributed to the larger amount of amino dimethylene bridges. The larger amount of amino dimethylene bridges correlates with the lower curing temperature.

matrix can serve as a secondary raw material and can be further used (cf. Example 13 in this regard).

Example 4

Several two-layer laminates were produced from an aviation-certified commercially available prepreg system with a phenolic resin matrix (resol resin) (Hexcel Hexply 250-38-644). The curing parameters of temperature and time were adjusted as follows:

135° C. for 90 min
135° C. for 180 min
150° C. for 30 min
150° C. for 60 min

The laminates produced in this way were all boiled for 24 h in 1,2-diaminoethane (boiling point 116° C.) at reflux.

Figure 3:
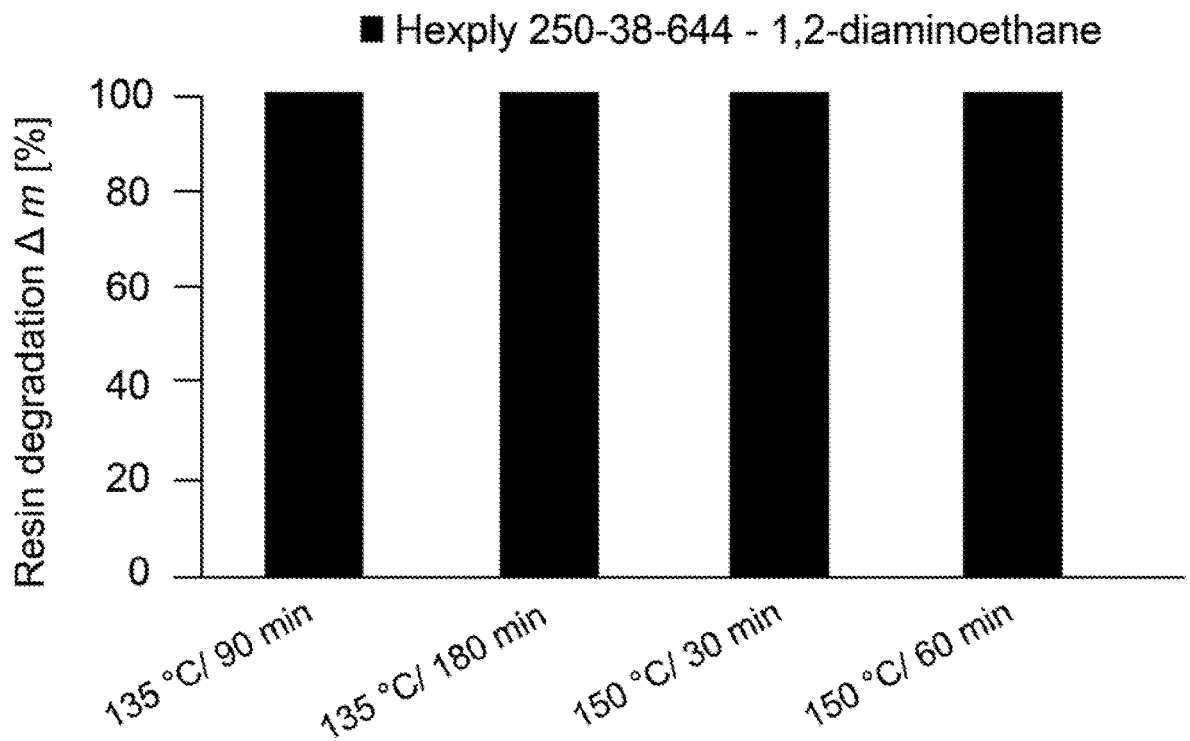
FIG. 3 demonstrates that the resin matrix of the cured laminates can be decomposed completely so that a fabric from which the matrix has been removed completely is recovered.

As FIG. 3 shows, the resin matrix of the cured laminates can be decomposed completely so that a fabric from which the matrix has been removed completely is recovered.

Example 5

Figure 4:
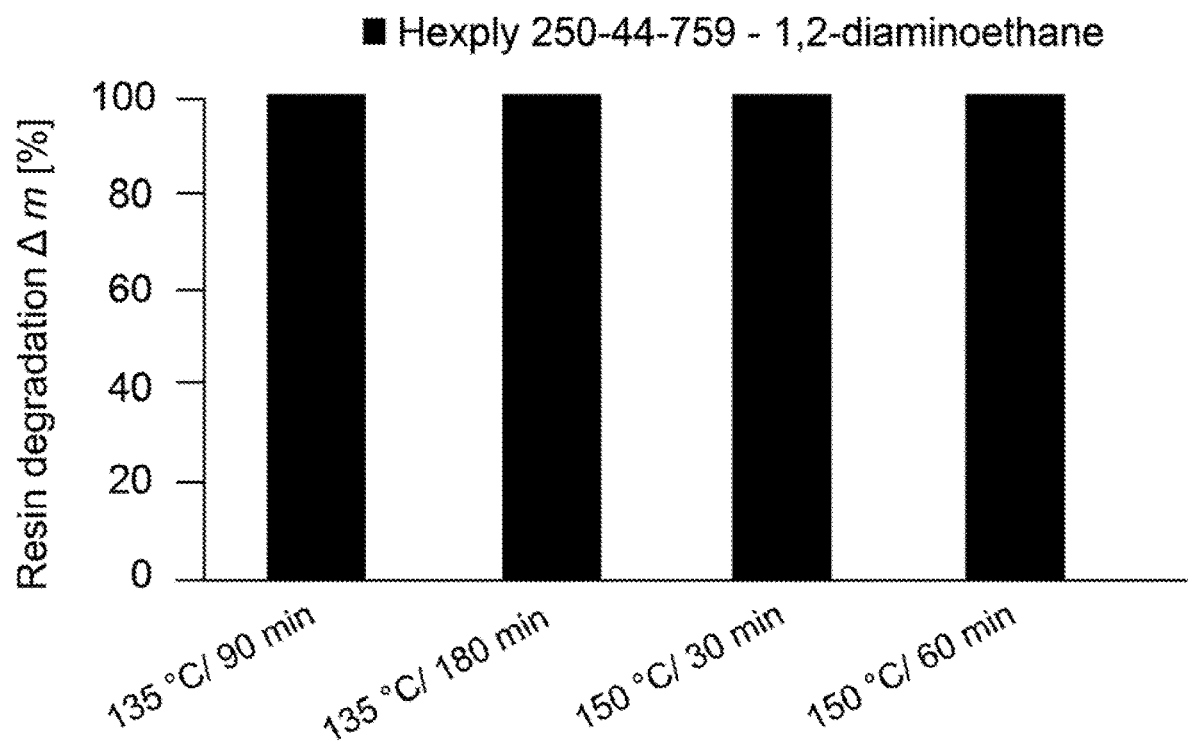
FIG. 4 shows results when the aviation-certified, commercially available prepreg system with a phenolic resin matrix Hexcel Hexply 250-44-759 was used.

Example 3 was repeated with the difference that instead of the aviation-certified prepreg system with phenolic resin matrix Hexcel Hexply 250-38-644, the aviation-certified, commercially available prepreg system with a phenolic resin matrix Hexcel Hexply 250-44-759 was used. The results were identical (see FIG. 4).

| No. | N [wt %] | C [wt %] | H [wt %] | $m_{sample}$ [mg] | N, C, H [wt %] | O [wt %] | Resin degradation in 1,2-diamino-ethane [wt %] | $T_{curing}$ [° C.] | $t_{curing}$ [min] |
|---|---|---|---|---|---|---|---|---|---|
| 1 | 2.841 | 74.926 | 6.771 | 1.339 | — | — | 100 | 130 | 45 |
| 2 | 2.569 | 74.887 | 6.722 | 1.317 | — | — | | | |
| 2(c) | 2.71 | 74.91 | 6.75 | — | 84.36 | 15.64 | | | |
| 1 | 2.446 | 75.404 | 6.712 | 1.301 | — | — | 92 ± 10 | 150 | 30 |
| 2 | 2.471 | 75.59 | 6.686 | 1.328 | — | — | | | |
| 2(d) | 2.46 | 75.50 | 6.70 | — | 84.65 | 15.35 | | | |
| 1 | 2.075 | 76.097 | 6.599 | 1.388 | — | — | 42 ± 10 | 170 | 20 |
| 2 | 2.065 | 76.062 | 6.606 | 1.412 | — | — | | | |
| 2(e) | 2.07 | 76.08 | 6.60 | — | 84.75 | 15.25 | | | |

Example 3

Several two-layer laminates were produced from an aviation-certified commercially available prepreg system with a phenolic resin matrix (resol resin) from Gurit Holding AG (PF812-G226-40). The curing parameters of temperature and time were adjusted as follows:

120° C. for 60 min
140° C. for 30 min
150° C. for 30 min
160° C. for 30 min
170° C. for 30 min
180° C. for 30 min The laminates produced in this way were all boiled for 24 h in 1,2-diamino ethane (boiling point 116° C.) at reflux.

Figure 2:
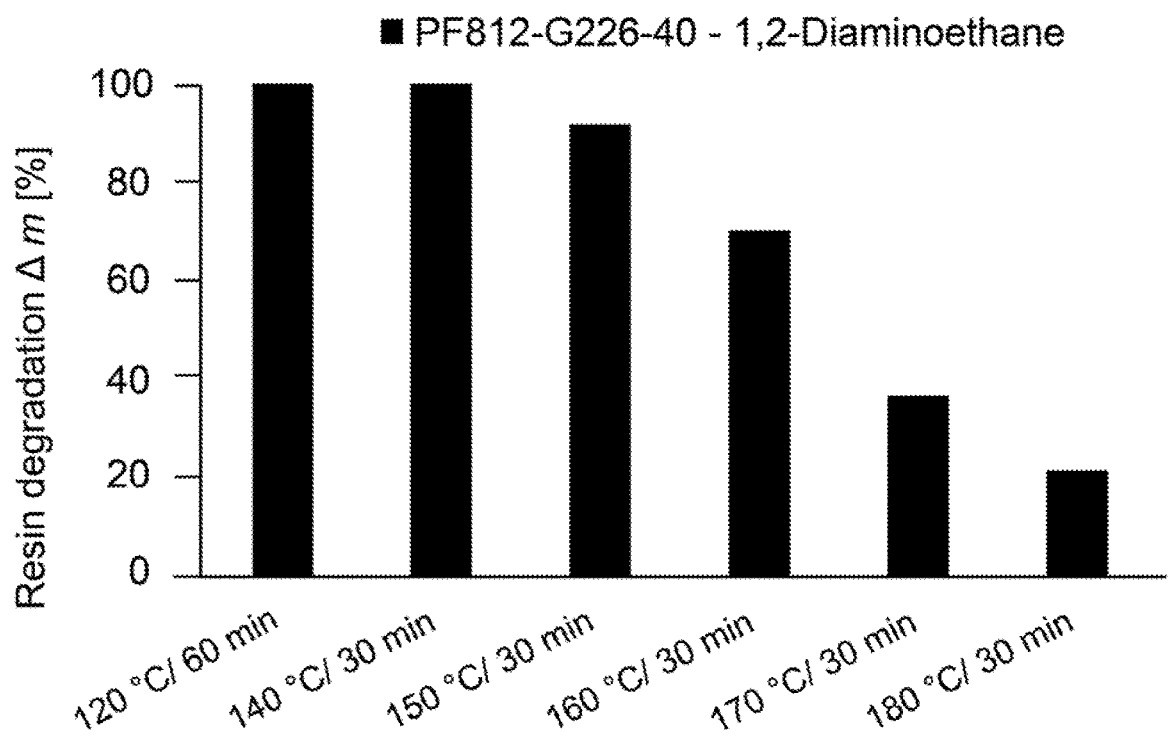
FIG. 2 shows the resin matrix of the laminates cured at a lower temperature can be decomposed completely so that a fabric from which the matrix has been completely removed is recovered by the method according to the invention.

As shown in FIG. 2, the resin matrix of the laminates cured at a lower temperature can be decomposed completely so that a fabric from which the matrix has been completely removed is recovered by the method according to the invention. However, also the fabric from which the resin has been only partially removed and which still contains residual Example 6

Several two-layer laminates were produced from an aviation-certified, commercially available prepreg system with a phenolic resin matrix (Hexcel Hexply 250-38-644). The curing parameters of temperature and time were adjusted as follows:

135° C. for 90 min
150° C. for 30 min

The laminates produced in this way were all boiled for 24 h in 1,2-diaminoethane (boiling point 116° C.) at reflux.

Figure 5:
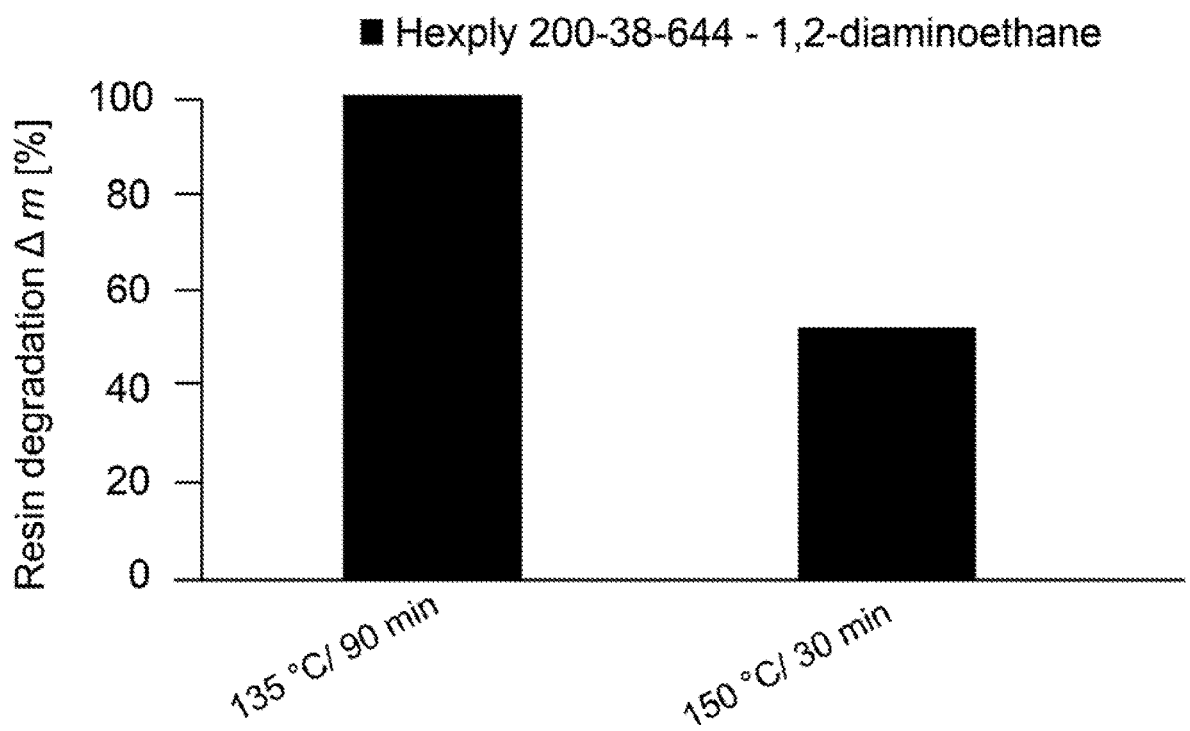
FIG. 5 demonstrates that the resin matrix of the laminates cured at 135° C. can be decomposed completely.

As shown in FIG. 5, the resin matrix of the laminates cured at 135° C. can be decomposed completely. Glass fiber fabrics completed freed of the resin matrix are recovered. However, the fabrics from which the matrix has been partially removed and which still contain residues of matrix from the laminates cured at 150° C. can also be used as a secondary raw material and can be further used (cf. example 13 in this regard).

Example 7

Figure 6:
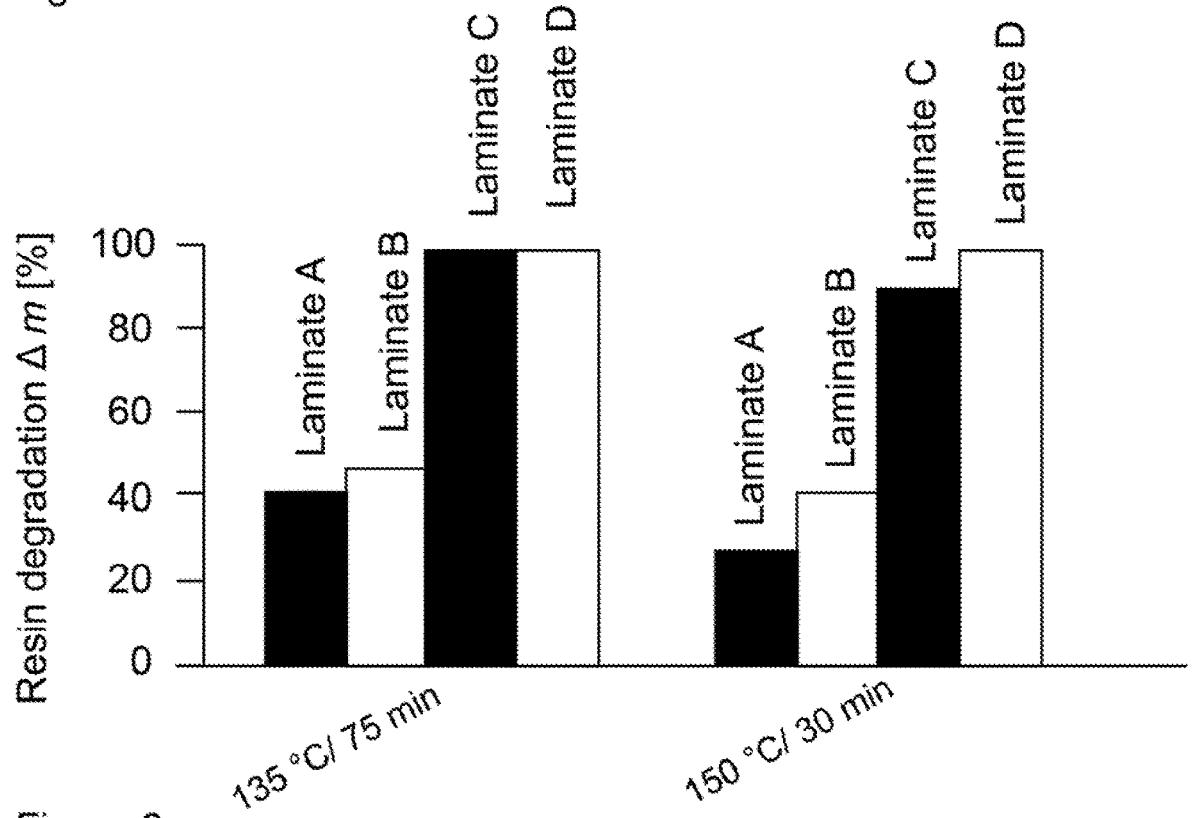
FIG. 6 shows that the resin matrix of the laminates C and D cured at 135° C. can be decomposed completely.

Example 3 was repeated with other prepreg systems using the phenolic resin matrix obtainable commercially from another manufacturer, wherein the following curing parameters (temperature and time) were set:
135° C. for 75 min
155° C. for 30 min As shown in FIG. 6, the resin matrix of the laminates C and D cured at 135° C. can be decomposed completely. Glass fiber fabrics from which the resin matrix has been removed completely are recovered. However, also the fabrics from which the matrix has only been partially removed and which still contain residues of matrix can serve as a secondary raw material and can be further used (cf. Example 13 in this regard).

Example 8

Laminates were first produced from two novolak resin prepolymers with different molecular weights [low molecular weight: 82 4439X DP106 (molecular weight: less than 10,000 g/mol); high molecular weight: 82 4439X DP132 (molecular weight: less than 100,000 g/mol)] distributed by Prefere Resins (formerly Dynea Erkner GmbH). These laminates were cured for 30 min at 150° C. As the curing agent two different concentrations of hexamethylenetetramine (HEXA) (6 or 11 wt %, based on the total weight of novolak and HEXA) were added.

The laminates produced in this way were all boiled for 24 h in 1,2-diaminoethane (boiling point 116° C.) at reflux.

As shown in Table 2, the novolak resins cured with a larger amount by weight of hexamethylenetetramine contain a significantly larger amount of nitrogen, which can be attributed to a larger amount of amino dimethylene bridges. The nitrogen content was determined by means of elemental analysis.

The better degradability can be attributed to the larger amount of amino dimethylene bridges.

Example 9

A two-layer laminate of the commercially available prepreg with a phenolic resin matrix (resol resin) PHG600-68-37 from the company Gurit was produced according to the manufacturers instructions following a curing program at 125° C. for 120 min. According to the manufacturers information, the prepregs are suitable for monolithic structures for aircraft, ship building, trains and automobiles. The laminate was then boiled for 24 hours in 1,2-diaminoethane (boiling point 116° C.) at reflux. The percentage of degraded matrix HA was 40±10 wt %, based on the weight of the matrix.

Example 10

Example 9 was repeated with the difference that PHG860-68-40 from the company Gurit was used as the commercially available prepreg with a phenolic resin matrix, which is suitable for monolithic structures and sandwich structures in the same field of applications as PHG600-68-37. The curing was carried out for a period of 60 min at 140° C. The percentage of degraded matrix HA was 62±10 wt %, based on the weight of the matrix.

Example 11

First, two-layer laminates were produced from commercially available prepregs with a phenolic resin matrix. These were subsequently treated with 1,2-diaminoethane and 2-aminoethanol for a maximum period of 24 h. The decomposition was always carried out at reflux at the boiling point of the respective reagent.

Table 3 shows the percentage degradation of the matrix resin. The resin matrix of laminates 3 and 4 can be decomposed completely by using 1,2-diaminoethane, so that clean fibers from which all resin has been removed are obtained. The resin matrix of these laminates could also be decomposed completely with 2-aminoethanol. It may be assumed that the resin matrices of the laminates of Examples 3 and 4 can also be degraded completely by using 2-aminoethanol.

TABLE 2

| No. | N [wt %] | C [wt %] | H [wt %] | $m_{sample}$ [mg] | N, C, H [wt %] | O [wt %] | Resin degradation in 1,2-diaminoethane [wt %] | HEXA content in production [wt %] |
|---|---|---|---|---|---|---|---|---|
| Low molecular 82 4439X DP106 | | | | | | | | |
| 1.1 | 1.24 | 76.50 | 6.08 | 1.32 | | | 33 ± 10 | 6 |
| 1.2 | 1.22 | 76.57 | 6.04 | 1.29 | | | | |
| 1 | 1.23 | 76.53 | 6.06 | | 83.82 | 16.18 | | |
| 2.1 | 2.73 | 75.51 | 6.11 | 1.31 | | | 66 ± 10 | 11 |
| 2.2 | 2.69 | 75.67 | 6.04 | 1.32 | | | | |
| 2 | 2.71 | 75.59 | 6.07 | | 84.37 | 15.63 | | |
| High molecular 82 4439X DP132 | | | | | | | | |
| 3.1 | 1.43 | 76.87 | 5.97 | 1.33 | | | 26 ± 10 | 6 |
| 3.2 | 1.44 | 76.81 | 5.96 | 1.38 | | | | |
| 3 | 1.44 | 76.84 | 5.97 | | 84.24 | 15.76 | | |
| 4.1 | 2.19 | 76.08 | 6.05 | 1.35 | | | 62 ± 10 | 11 |
| 4.2 | 2.20 | 76.05 | 6.06 | 1.31 | | | | |
| 4 | 2.20 | 76.06 | 6.05 | | 84.31 | 15.69 | | |

TABLE 3

| Title | Type of prepreg | Curing program | Resin degradation [wt %] recycling reagent 1 1,2-diaminoethane | Resin degradation [wt %] recycling reagent 7 2-aminoethanol |
|---|---|---|---|---|
| Laminate 1 | Gurit PHG600-44-37 | 125° C./120 min | 64 ± 10 | 59 ± 10 |
| Laminate 2 | Hexcel Hexply 200-38-644-127 cm | 135° C./90 min | 99 | 91 ± 8 |
| Laminate 3 | Hexcel Hexply 250-38-644 | 135° C./90 min | 100 | 100 |
| Laminate 4 | Hexcel Hexply 250-44-759 | 135° C./90 min | 100 | 100 |

Example 12

A screening with 6 different decomposition reagents was carried out with laminate 1. The decomposition was always carried out at the boiling point of the respective reagent at reflux. Aliphatic diamines, monoamines and amino alcohols with different chain lengths were used as the decomposition reagents.

Figure 7:
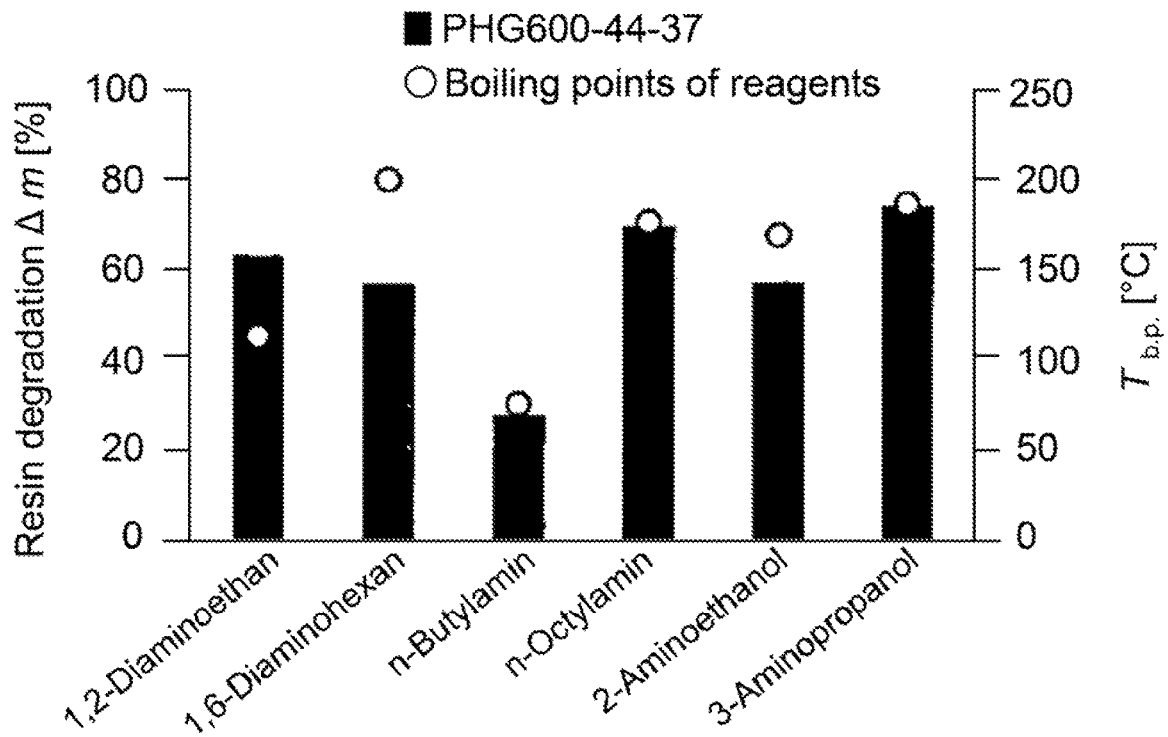
FIG. 7 depicts the results obtained in a screening with 6 different decomposition reagents carried out with laminate 1. Aliphatic diamines, monoamines and amino alcohols with different chain lengths were used as the decomposition reagents.

FIG. 7 shows the results obtained in the experiments. It is found that amines are generally suitable for decomposing phenolic resins because both simple, mainly primary monoamines and diamines and amino alcohols can be used for aminolysis according to the invention. The best results for laminate 1 were obtained with n-octylamine and 3-aminopropanol. Comparison of the different aminolysis reagents also shows that longer-chain alkyl and/or alkylene groups in the reagent can have a positive influence on the rate of decomposition and/or the resin degradation in comparison with reagents with shorter-chain alkyl(ene) groups (see the comparison between n-butylamine and n-octylamine and the comparison between 2-aminoethanol and 3-aminopropanol).

The investigations described in this example also show that degradation with difunctional amines such as 1,2-diaminoethane or 2-aminoethanol need not necessarily proceed more rapidly or more thoroughly in comparison with a monofunctional amine having no additional reactive group (e.g., a second amino group or a hydroxyl group).

Example 13

A glass fiber-reinforced laminate was produced from the resol resin system synthesized according to synthesis example B1. After impregnation of the glass fiber fabric with the phenolic resin dissolved in methanol, preliminary crosslinking was carried out in a circulating air furnace. Then the prepregs produced in this way were pressed by means of a hydraulic press to form a two-layer laminate. The curing temperature was always 150° C. and the curing time was 15 min.

Next the laminates produced in this way were boiled for 24 h in various reagents at reflux.

Figure 8:
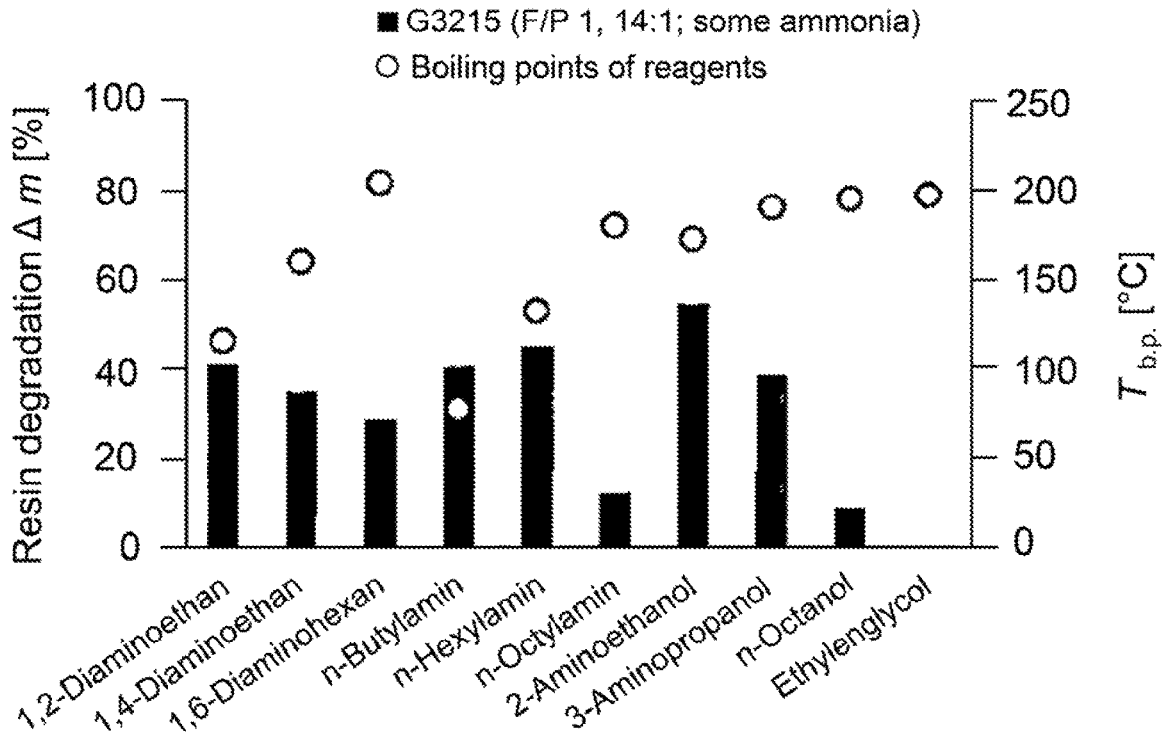
FIG. 8 shows the results obtained in the experiments according to Example 13.

FIG. 8 shows the results obtained in the experiments. It is found that amines are generally suitable for decomposing phenolic resins because simple monoamines, mainly primary monoamines, as well as diamines and amino alcohols can be used for aminolysis according to the invention. With this phenolic resin system, the best results are obtained with 2-aminoethanol, 1,2-diaminoethane, n-hexylamine, n-butylamine and 3-aminopropanol.

Example 14

This example shows that not only aliphatic amines but also aromatic amines can be used as the degradation reagent.

A novolak resin system synthesized according to synthesis example B2(b), dissolved in methanol, was used for impregnation of a glass fiber fabric. Then a preliminary crosslinking was performed in a circulating air furnace. Next the prepregs produced in this way were pressed by means of a hydraulic press to form two-layer laminates. The curing temperature was 130° C. and the curing time was 45 min.

Next the laminate produced in this way was boiled for 72 h in aniline at reflux (boiling point 184° C.). The resin matrix of the cured laminates was decomposed completely, so that the fabric thereby recovered was completely free of matrix.

Example 15

This example shows that an analysis can also be carried out in the presence of an inert solvent.

A novolak resin system synthesized according to synthesis example B2(b), dissolved in methanol, was used for impregnation of a glass fiber fabric. Then a preliminary crosslinking was performed in a circulating air furnace. Next the prepregs produced in this way were pressed by means of a hydraulic press to form two-layer laminates. The curing temperature was 130° C. and the curing time was 45 min.

Next the laminate produced in this way was boiled for 24 h in a mixture of 50 wt % chloroform and 50 wt % 2-aminoethanol at reflux. The resin matrix of the cured laminates could be decomposed completely so that the fabric recovered was completely free of matrix.

Example 16

Figure 10:
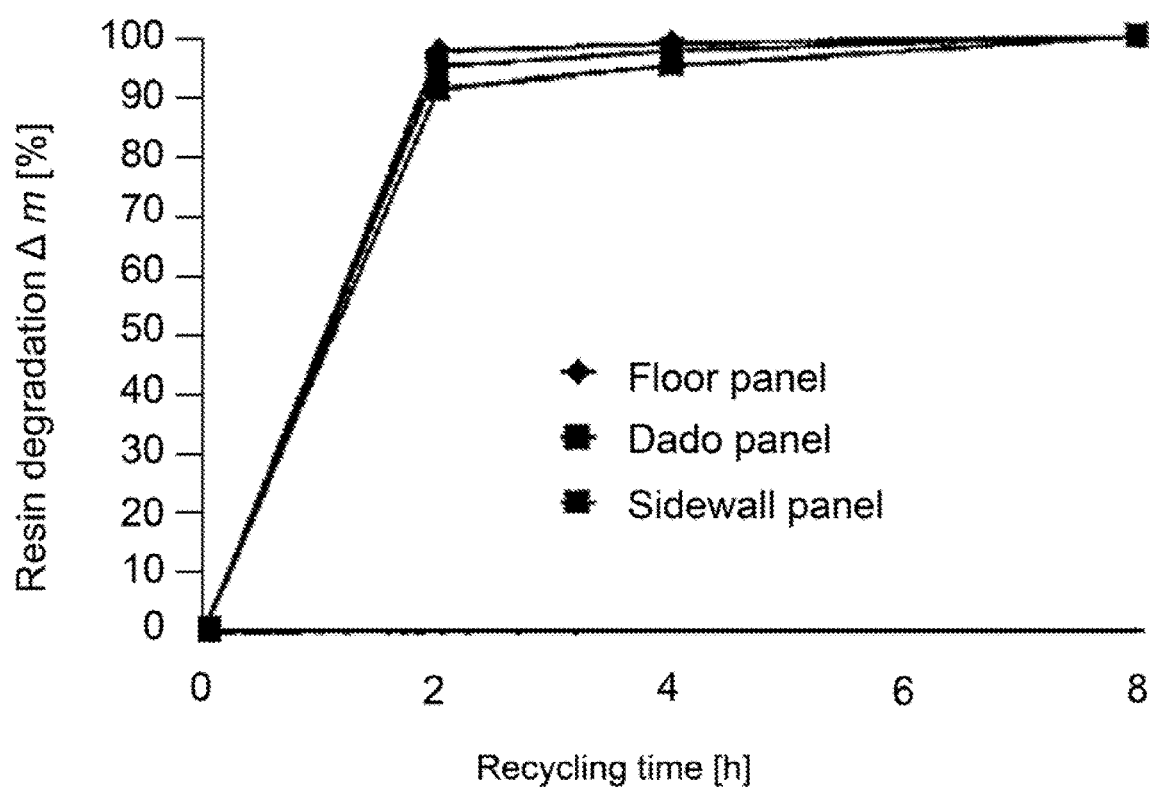
FIG. 10 shows the results of the time-dependent degradation of the resin matrix of the various cover layers in 1,2-diaminoethane at reflux at 116° C.

Degradation of Commercial Components in 1,2-Diaminoethane as a Function of Time:

Degradation experiments were carried out on cover layers of original sidewall, ceiling and dado panels of an Airbus A320 and on cover layers of an original floor panel of an A300-600. As is customary with cabinet components in aviation, all the cover layers have a phenolic resin matrix. Depending on the type of component, fabric from which the resin matrix had been removed completely and fabric still containing some residual resin were obtained. Furthermore, the time required for decomposition of the matrix of the cover layers of floor, sidewall and dado panels was determined. Since the resin matrix of the ceiling panel could not be completely decomposed, the time-dependent determination of matrix decomposition was not performed here. FIG. 10 shows the results of the time-dependent degradation of the resin matrix of the various cover layers in 1,2-diaminoethane at reflux at 116° C. All the cover layer matrices were at least 97% decomposed within 8 hours by the method according to the invention.

Example 17

Degradation of Commercial Components at 40° C. in 1,2-Diaminoethane:

Degradation experiments were carried out on cover layers of original ceiling and dado panels of an Airbus A320. As is customary with cabin components in aviation, all the cover layers have a phenolic resin matrix. Depending on the type of component, in some cases fabric from which the resin matrix had been removed completely was obtained and in other cases fabric that still contained residual matrix was obtained.

In this way the phenolic resin matrix of the dado panel was completely decomposed after 11,600 h in 1,2-diaminoethane while the phenolic resin matrix of the ceiling panel was 43±10 wt % decomposed after 11,600 h in 1,2-diaminoethane.

Example 18

Investigation of the Stability of Reinforcing Fibers in Decomposition Reagents—Tensile Tests The fiber rovings and yarns that were investigated were stored at various temperatures in different decomposition reagents in 50 mL round bottom flasks equipped with a Dimroth condenser. After being treated, the fiber rovings were washed with ethanol and dried at room temperature in a vacuum drying cabinet. Then tensile tests were performed using an Instron 3369 with a 500N strain gauge and a special module for testing fine samples. The distance between the two clamping jaws and thus the measurement length was always 30 mm and the test speed was set to 2.5 mm·min$^{-1}$.

To check whether the washing process had an influence on the results, fibers were washed with ethanol and then compared with unwashed fibers from the standpoint of mechanical properties. No influence of the washing process on the mechanical properties was detected with any of the types of fibers used here.

PAN-based 3K carbon fiber rovings (2,000 dtex), glass fiber rovings (E-glass; approx. 680 dtex), aramid fiber rovings (approx. 1,730 dtex), polyamide fiber rovings (PA 6, approx. 1,880 dtex) as well as twisted natural fibers (based on flax; approx. 530 dtex) were used.

Five selected types of fibers were stored for 1 h in three different reagents at each of the temperatures selected in all the experiments described below and their mechanical properties were tested on the basis of tensile tests on fiber rovings and/or fiber yarns.

Figure 11:
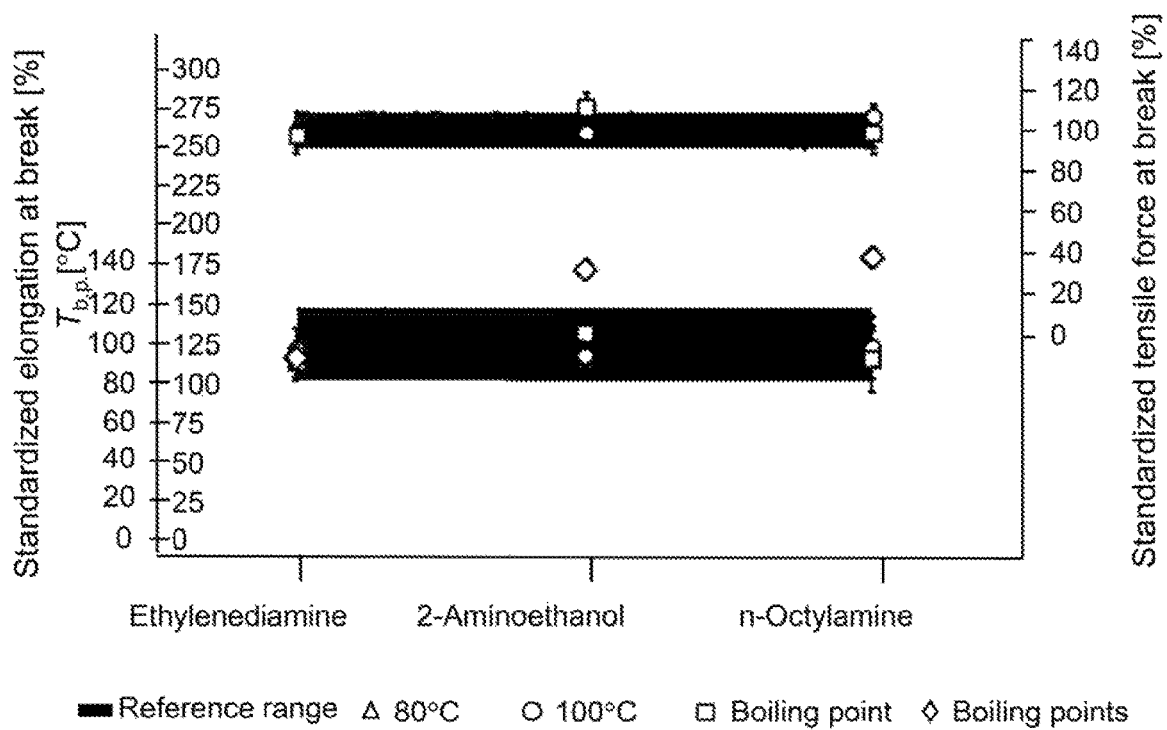
FIG. 11 displays the results of the mechanical tensile tests of treated and untreated carbon fiber rovings.

In the case of carbon fibers, no significant influence on their mechanical properties could be detected with all the reagents under all three selected temperatures. FIG. 11 shows the results of the mechanical tensile tests of treated and untreated carbon fiber rovings.

Figure 12:
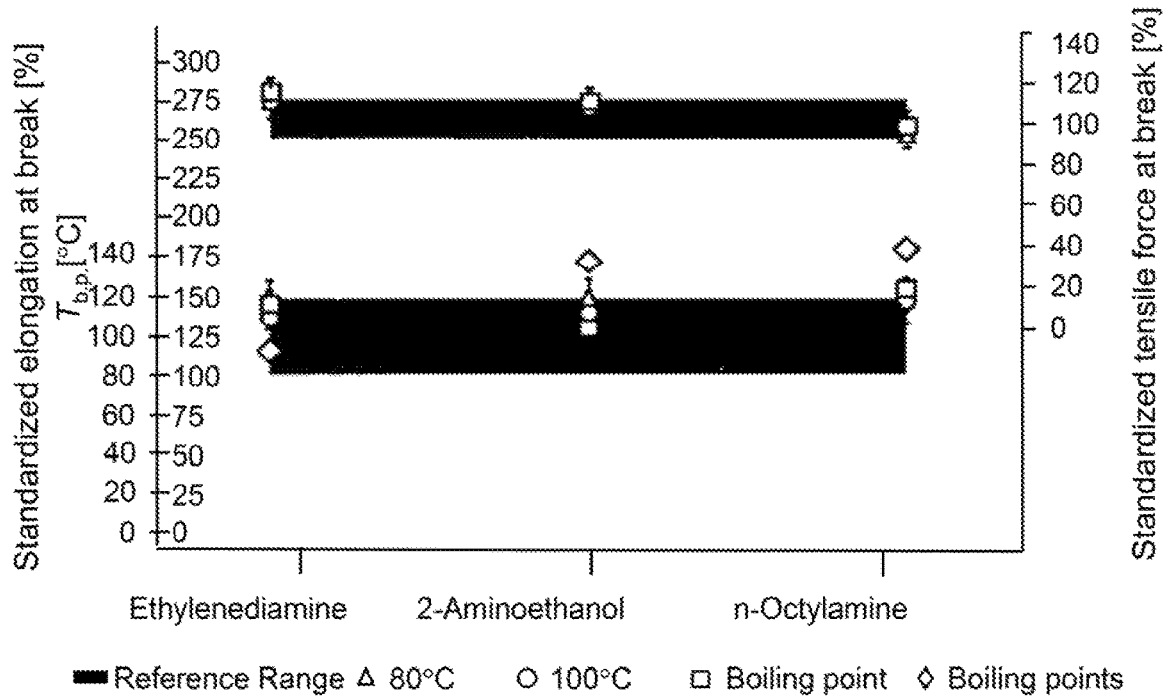
FIG. 12 shows that with glass fibers, a negative effect on the mechanical properties due to treatment with the different reagents could not be detected at any temperature within the scope of measurement accuracy.

With glass fibers, a negative effect on the mechanical properties due to treatment with the different reagents could not be detected at any temperature within the scope of measurement accuracy (see FIG. 12).

Figure 13:
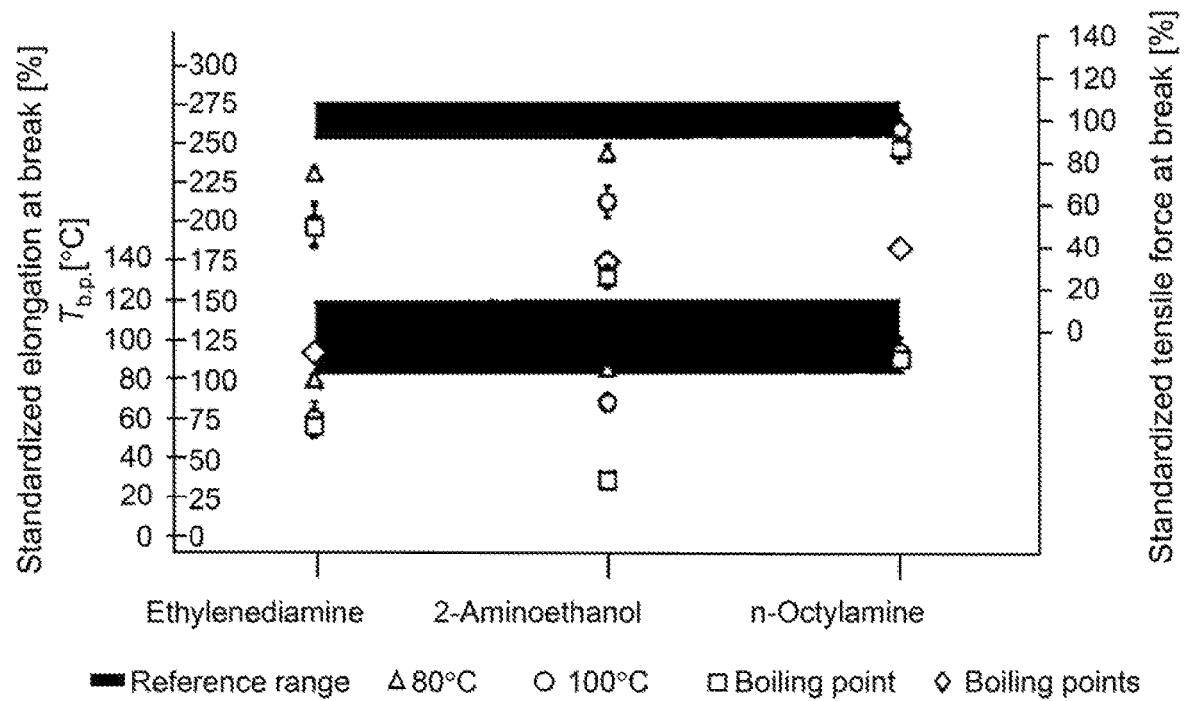
FIG. 13 demonstrates a correlation between the tensile elongation and tensile strength of the fibers.

Aramid fibers are damaged by using 1,2-diaminoethane or 2-aminoethanol. A great reduction in the mechanical properties is found as a function of storage temperature in the case of 2-aminoethanol in particular. In these experiments, a correlation between the tensile elongation and tensile strength of the fibers is also detected. However, aramid fiber-reinforced composite plastics can be recycled with n-octylamine, so it is advisable to use n-octylamine here (see FIG. 13).

Figure 14:
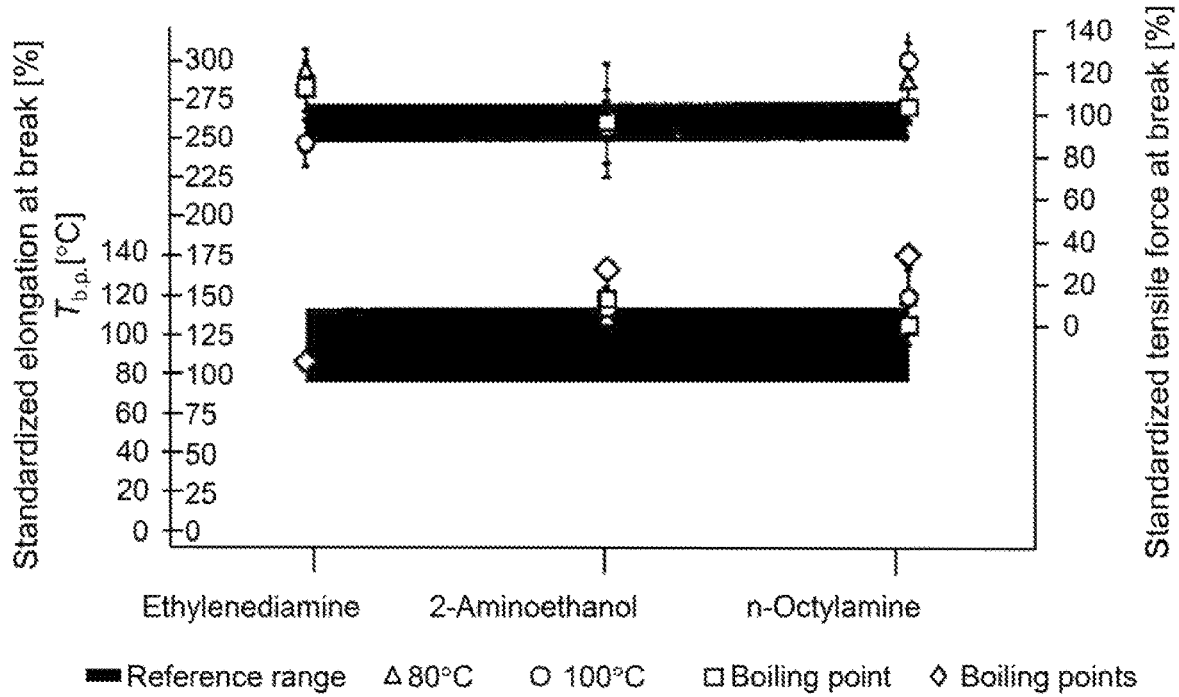
FIG. 14 shows that in the case of natural fibers, no significant negative effect on their mechanical properties could be detected with any of the reagents at all three temperatures selected.

In the case of natural fibers, no significant negative effect on their mechanical properties could be detected with any of the reagents at all three temperatures selected (see FIG. 14). The great increase in the elongation at break after storage in ethylenediamine here is especially noteworthy. This supports the assumption that the flax fibers used in these experiments are chemically modified when stored in 1,2-diaminoethane.

Figure 15:
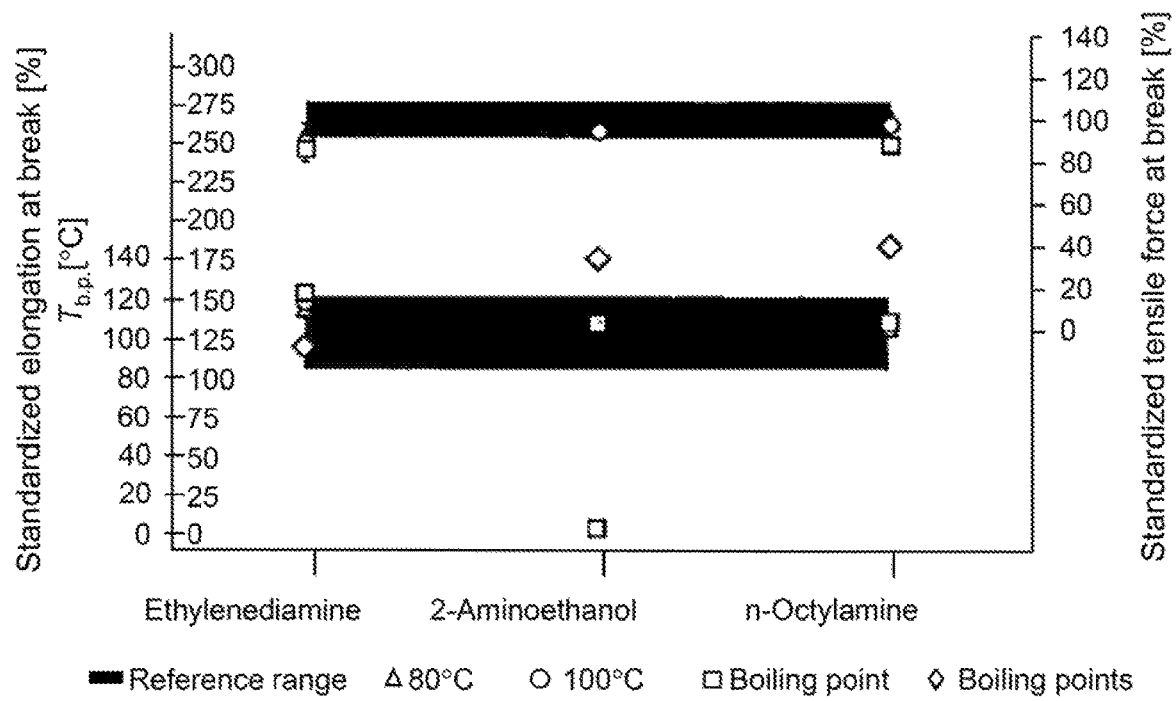
FIG. 15 demonstrates that in particular, 1,2-diaminoethane and n-octylamine are suitable for decomposition of composite plastics that contain polyamide.

The polyamide fibers (PA 6) form an exception in the context of the work conducted here in the chemical stability of reinforcing fibers. It has been found that polyamide 6 [nylon 6] fibers will dissolve in 2-aminoethanol at reflux, whereas the polyamide is insoluble in less polar and/or low-boiling reagents. It has also been found that in particular 1,2-diaminoethane and n-octylamine are suitable for decomposition of composite plastics that contain polyamide, because there is no significant influence on the mechanical properties, even under reflux conditions (see FIG. 15).

Example 19

Figure 16:
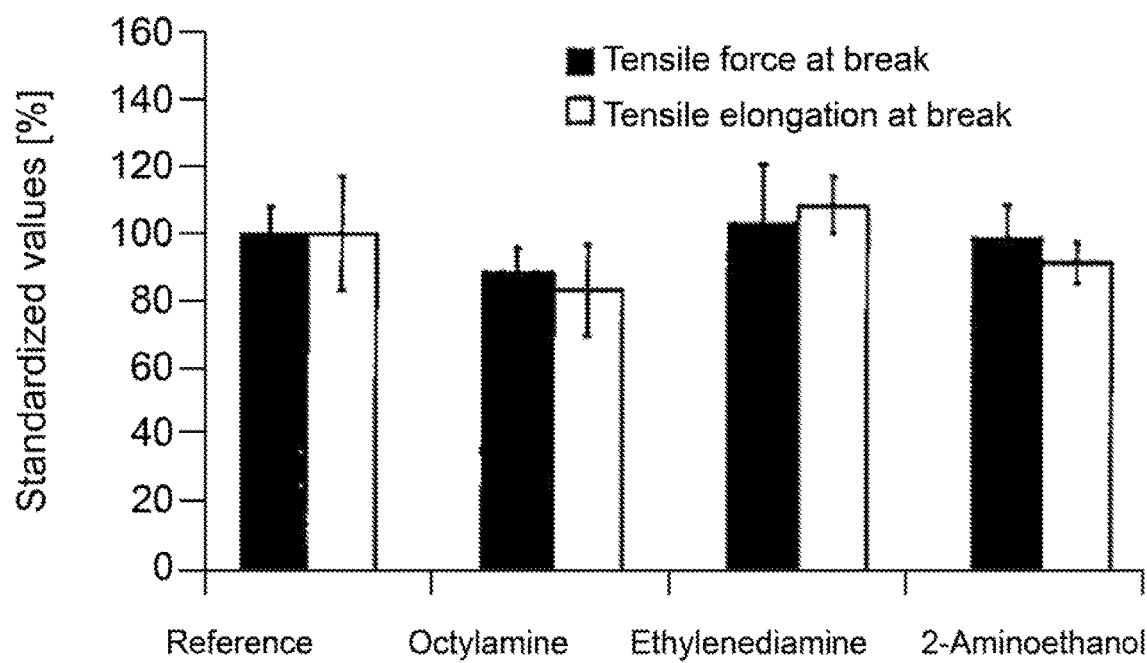
FIGS. 16 and 17 show the results of the tensile tests (tensile force shown at the left, darker bar, tensile elongation at the right, lighter bar) on untreated carbon fiber rovings and those treated for 24 hours in the reagents at reflux and/or glass fibers under the same conditions.
Figure 17:
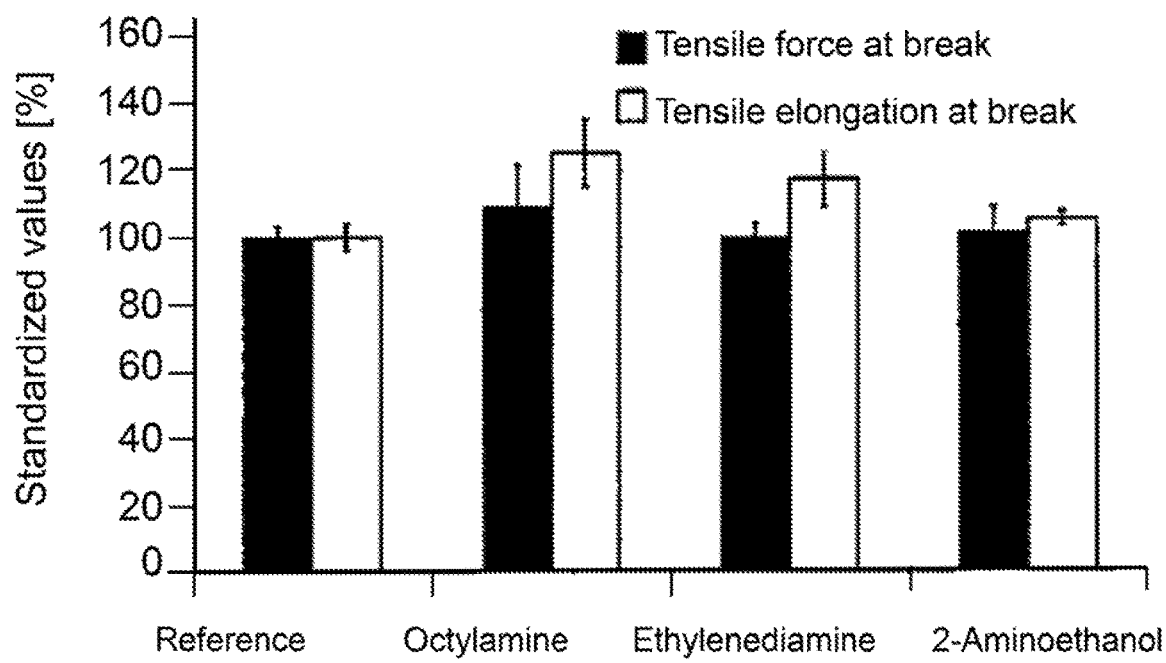

Investigation of the Stability of Carbon and Glass-Reinforcing Fibers in Decomposition Reagents—Tensile Tests The fibers to be investigated were stored as described in Example 15 in 50 mL round bottom flasks with an attached Dimroth condenser. FIGS. 16 and 17 show the results of the tensile tests (tensile force shown at the left, darker bar, tensile elongation at the right, lighter bar) on untreated carbon fiber rovings and those treated for 24 h in the reagents at reflux (FIG. 15) and/or glass fibers under the same conditions (FIG. 16). The following table shows an overview of the reagents used as well as their boiling points. The fibers were not damaged by the reagents tested and could thus be used again as reinforcing fibers after performing decomposition of the phenolic resin-containing matrix.

| Reagent | $T_{b.p.}$ [° C.] |
|---|---|
| n-octylamine | 180 |
| 1,2-diaminoethane | 116 |
| 2-aminoethanol | 172 |

Example 20

This example illustrates the use of the inventive degradation method for cleaning soiled objects such as molds.

An aluminum mold that had been used for production of honeycombs and was soiled with adhering cured phenolic resin, was stored for about 24 h in ethylenediamine heated to 70° C. in a closed glass beaker for cleaning. After the aluminum mold was removed, the phenolic resin residues decomposed by aminolysis were washed off with ethanol.

Example 21

Degradation of Commercial Components in 2-Aminoethanol in a Microwave System:

Degradation experiments were carried out on cover layers of an original dado panel of an Airbus A320 in a microwave system at various power levels. The dado panel cover layers had a phenolic resin matrix, as is customary for cabin components in aviation.

The phenolic resin matrix of the dado panel was completely decomposed after 3.8 min at a radiated power of 3.1 kW, after 2.6 min at a radiated power of 4.1 kW, and after 2.2 min at a radiated power of 5.1 kW. The degree of decomposition was tested by means of TGA. Microwave radiation at a frequency of 2.45 GHz was used for the decomposition.

Figure 19:
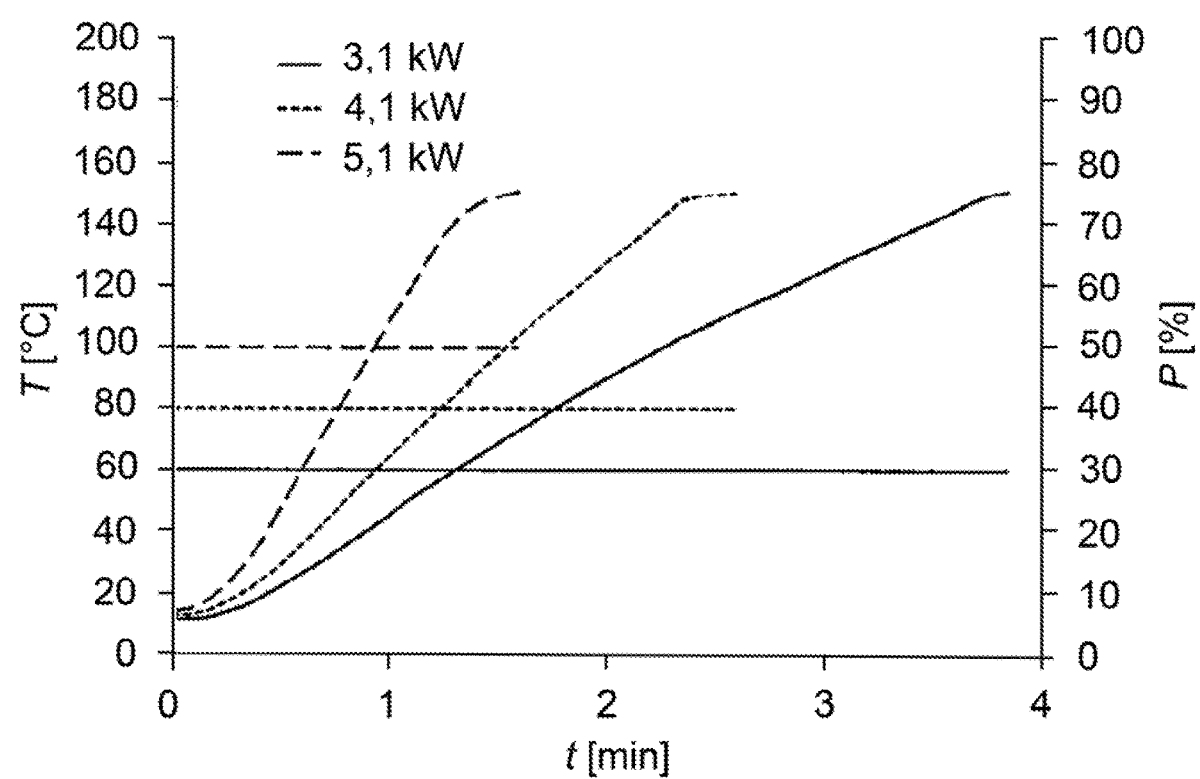
FIG. 19 shows the heating ramps of three experiments that were conducted at a radiated power of 3.1 kW, 4.1 kW, and 5.1 kW.

FIG. 19 shows the heating ramps of the three experiments that were conducted.

D. New Synthesis of Polymers Using the Degradation Products According to the Invention Example 1—Detection of H₂N and HNR or OH Groups The degradation products obtained according to Example 2(a) by decomposition with 2-aminoethanol were tested to determine their hydroxyl and amine values. After performing all determinations twice, an OH value of 912 mg KOH/g (relative standard deviation=0.88%) and an amine value of 5.91 mol/kg (relative standard deviation=0.17%) was obtained. The hydroxyl value was determined in accordance with DIN 53240-2 (2007), while the amine value was determined according to DIN 1877-2 (2000).

Figure 18:
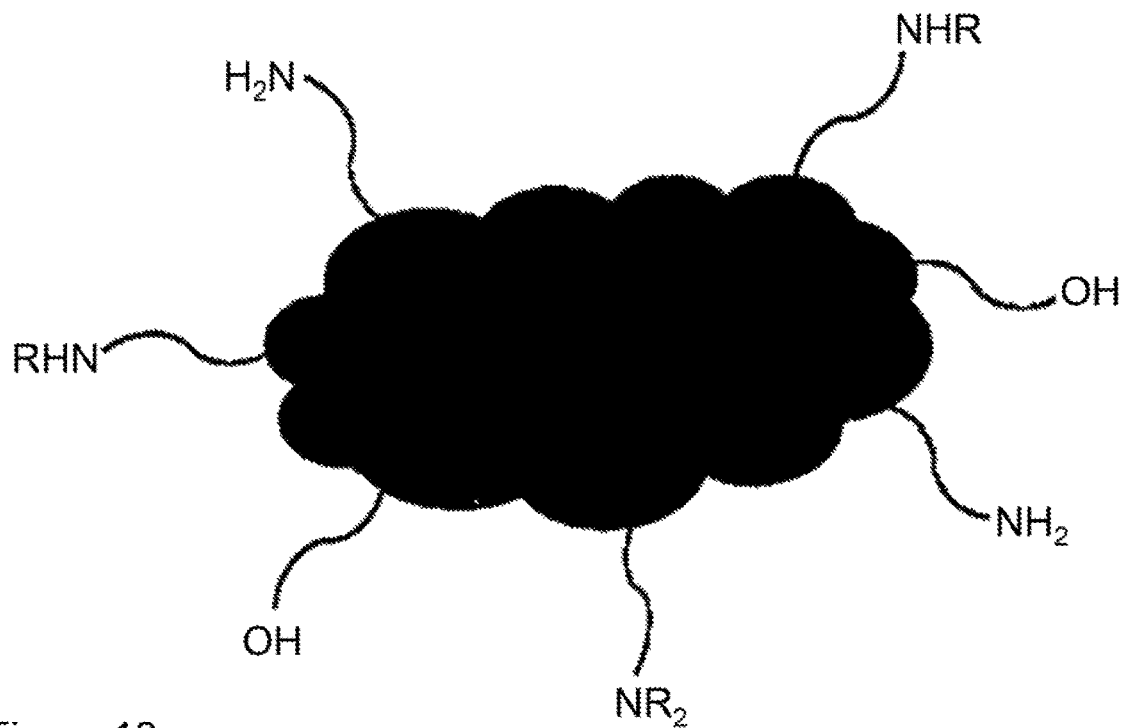
FIG. 18 illustrates the degradation products as having free hydroxyl and amine functionalities which can be converted back to polymers by reacting them with additional, at least bifunctional or bifunctionalizable monomers.

According to these findings, the degradation products as illustrated in FIG. 18 have free hydroxyl and amine functionalities which can be converted back to polymers by reacting them with additional, at least bifunctional or bifunctionalizable monomers, in particular with the starting components for production of phenolic resins.

Example 2

Glass fiber-reinforced sandwiches were produced from a novolak resin system synthesized according to Synthesis Example B2(b).

After impregnation of a glass fiber fabric with the novolak resin synthesized according to B2(b) and dissolved in methanol, preliminary crosslinking was carried out in a circulating air furnace. Next the prepregs produced in this way were pressed by means of a hydraulic press with a honeycomb structure as the core material to form sandwich boards (135° C. for 40 min). The cured cover layers of the sandwich constructions were then removed, and the phenolic resin matrix was subjected to aminolysis with 2-aminoethanol.

The fiber layers from which the resin had been removed were then taken from the solution, washed and dried.

The excess aminolysis reagent was separated from the recycled product at a reduced pressure.

Then a novolak was synthesized again according to Synthesis Example B2(a) and combined with different amounts of recycled product (10, 25 and 50 wt %). Next, 6 wt % hexamethylenetetramine, based on the sum of novolak, recycled product and hexamethylenetetramine, was added.

Prepregs could be produced again from the novolak resin containing recycled product produced in this way and these prepregs were then used to produce sandwich components.

Example 3

This example relates to reuse of fabrics from which all the phenolic resin matrix has been removed and fabrics which still contain some residual phenolic resin.

Components produced from fabrics from which the old matrix has been completely removed exhibit almost the same flexural module as components produced using new fabric.

Figure 9:
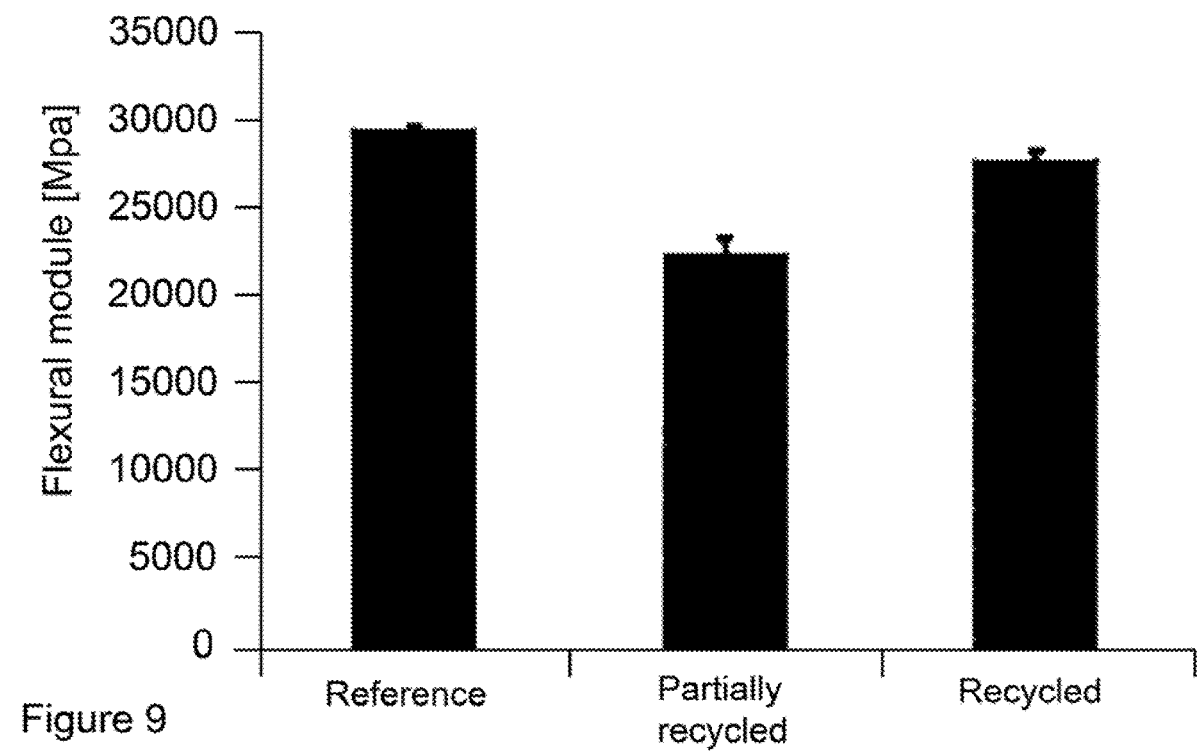
FIG. 9 depicts the flexural modulus of various components with a glass fiber fabric reinforcement as described in exemplary embodiment A.

FIG. 9 shows the flexural modulus of various components with a glass fiber fabric reinforcement as described in exemplary embodiment A:
  Reference: component produced from new fabric.
  Partially recycled: component produced from fabric with adhering residual resin.
  Recycled: component produced from fabric from which all the old matrix had been completely removed.

What is claimed is:

1. A method for degradation of a phenolic resin-containing material, comprising the phenolic resin-containing material being subjected to aminolysis with a reagent containing at least one amino group, wherein the reagent containing at least one amino group is ammonia, an aliphatic or aromatic amine or hydrazine, which may contain additional functional groups, or a mixture of two or more of the aforementioned reagents.

2. The method according to claim 1, wherein the reagent containing at least one amino group is selected from the group of compounds comprising aliphatic primary amines, aromatic amines, amino alcohols and diamines, wherein the reagent has one, two or more of these compounds.

3. The method according to claim 2, wherein the aliphatic primary amines and diamines each have a linear or branched alkyl or alkylene radical.

4. The method according to claim 1, wherein the reagent containing the at least one amino group is used under pressureless conditions or under pressure in a condensed state or after melting at an elevated temperature, as a solvent.

5. The method according to claim 1, wherein the aminolysis is carried out in a solvent, selected from a cyclic ether, alcohol, chlorocarbon or a solvent containing nitrogen.

6. The method according to claim 5, wherein the solvent is tetrahydrofuran, dimethyl sulfoxide, ethanol, water, dioxane, dichloromethane, chloroform, dimethylformamide or N-methyl-2-pyrrolidone.

7. The method according to claim 1, wherein the phenolic resin-containing material contains an amount of dimethylene ether bridges corresponding to an oxygen content of the phenolic resin in the material of at least 17.0 wt %.

8. The method according to claim 1, wherein the phenolic resin of the phenolic resin-containing material is a resol.

9. The method according to claim 1, wherein the phenolic resin of the phenol resin-containing material is a novolak with dimethyleneamino bridges, wherein the amount of dimethyleneamino bridges corresponds to a nitrogen content of the phenolic resin in the material of at least 1.2 wt %.

10. The method according to claim 1, wherein the phenolic resin is a novolak which has been produced by using at least one triglyceride or triglyceride mixture containing unsaturated fatty acids.

11. The method according to claim 1, wherein the phenolic resin-containing material is a phenolic resin-based fiber composite plastic, and the fiber composite, optionally with phenolic resin residues remaining on it is separated from the reagent containing at least one amino group after aminolysis has been performed and then is optionally reused.

12. The method according to claim 11, wherein the fibers of the plastic are selected from the group consisting of glass fibers, carbon fibers, aramid fibers, basalt fibers and natural fibers.

13. The method according to claim 11, wherein the fibers of the plastic are polyamide fibers and the reagent containing the at least one amino group is a linear alkylamine having three to 12 carbons in the alkyl chain.

14. The method according to claim 1, wherein the aminolysis is carried out with the input of microwave energy.

15. The method according to claim 1, wherein the phenolic resin-containing material adheres in the form of an impurity to an object, and the object is separated from the reagent containing the at least one amino group after aminolysis has been performed.

16. A method for synthesis and degradation of a phenolic resin-containing material, wherein the phenolic resin-containing material is created by curing the starting components at a temperature of less than 140° C. and, for the purpose of degradation, is subjected to an aminolysis with a reagent containing at least one amino group according to claim 1.

17. The method according to claim 16, wherein the phenolic resin-containing material has an oxygen content of at least 17 wt %, based on the weight of the phenolic resin, and/or wherein the phenolic resin-containing material has a nitrogen content of at least 1.5 wt %, based on the weight of the phenolic resin.

18. A method for synthesis and degradation of a phenolic resin-containing material in the form of a novolak, wherein
(i) (a) the phenolic resin-containing material is created by curing the starting components at a temperature of less than 180° C., and/or
(b) the phenolic resin-containing material has been produced by using at least one triglyceride or triglyceride mixture, and/or
(c) the amount of amino compound provided for curing is >6 wt %, and
(ii) for the purposes of degradation, the resin is subjected to aminolysis with a reagent containing at least one amino group as defined in claim 1.

19. A method for producing a novolak that is completely or partially degradable by aminolysis, comprising:
(a) reacting a phenolic component with an aldehyde in the presence of (i) an acid, (ii) an amine curing agent and (iii) a triglyceride or a triglyceride mixture, and
(b) curing the resin formed according to (a) at a temperature of ≤180° C., wherein the amine-curing agent is hexamethylenetetramine.

20. The method according to claim 19, wherein
(a) the phenolic component is selected from the group consisting of phenol, xylene, cresol, condensed, optionally alkyl-substituted phenols and mixtures of two or more of these phenolic components, and/or
(b) the acid is an aromatic sulfonic acid and/or
(c) the aldehyde is selected from formaldehyde, acetaldehyde, propionaldehyde, n-butyraldehyde, glyoxal and furfural and a mixture of two or more of these aldehydes,
and/or
(d) the amine-curing agent is hexamethylenetetramine and/or
(e) wood oil is used as the triglyceride or triglyceride mixture.

21. A method for reusing a phenolic resin-containing material, comprising
degradation of the material as defined in claim 1, wherein a liquid and components optionally in a solid condition are formed,
in the case of components remaining in the solid state, these components are separated from the liquid,
the liquid is treated to remove volatile products, under a reduced pressure and/or at an elevated temperature, forming a nonvolatile residue,
the nonvolatile residue is mixed with starting materials required for synthesis of a phenolic resin or with one or more compounds selected from monomers, oligomers or polymers having at least two functional groups which react with amino groups and/or hydroxyl groups, wherein the compounds are selected from isocyanates, activated (meth)acrylic acid compounds, cyanates and epoxy resins.

22. The method according to claim 10, wherein wood oil is used as the triglyceride or triglyceride mixture.

\* \* \* \* \*